(12) United States Patent
Janzen

(10) Patent No.: US 12,265,498 B2
(45) Date of Patent: Apr. 1, 2025

(54) SYSTEMS AND METHODS FOR ELECTRONICALLY TRACKING CLIENT DATA

(71) Applicant: Avalara, Inc., Seattle, WA (US)

(72) Inventor: Mark Janzen, Wichita, KS (US)

(73) Assignee: Avalara, Inc., Seattle, WA (US)

( * ) Notice: Subject to any disclaimer, the term of this patent is extended or adjusted under 35 U.S.C. 154(b) by 287 days.

(21) Appl. No.: 17/574,412

(22) Filed: Jan. 12, 2022

(65) Prior Publication Data

US 2023/0222091 A1 Jul. 13, 2023

(51) Int. Cl.
*G06F 16/00* (2019.01)
*G06F 16/11* (2019.01)
*G06F 16/38* (2019.01)
*G06F 40/117* (2020.01)

(52) U.S. Cl.
CPC .......... *G06F 16/119* (2019.01); *G06F 16/381* (2019.01); *G06F 40/117* (2020.01)

(58) Field of Classification Search
CPC .... G06F 16/119; G06F 16/381; G06F 16/907; G06F 40/117
See application file for complete search history.

(56) References Cited

U.S. PATENT DOCUMENTS

| | | | |
|---|---|---|---|
| 7,783,536 B2 | 8/2010 | William et al. | |
| 7,933,803 B1 | 4/2011 | Nadler et al. | |
| 8,620,578 B1 | 12/2013 | Brown et al. | |
| 8,725,407 B2 | 5/2014 | Hurley et al. | |
| 9,760,915 B2 | 9/2017 | Pavlou et al. | |
| 10,445,818 B1 | 10/2019 | Chowdhary | |
| 10,769,611 B2 | 9/2020 | McNeel | |
| 2002/0075514 A1 | 6/2002 | Wright | |
| 2002/0138765 A1 | 9/2002 | Fishman et al. | |
| 2007/0136158 A1 | 6/2007 | Rawlings et al. | |
| 2007/0136159 A1 | 6/2007 | Rawlings et al. | |
| 2012/0059700 A1 | 3/2012 | Darbyshire | |

(Continued)

OTHER PUBLICATIONS

International Search Report and Written Opinion received for PCT Patent Application No. PCT/US2022/052417, mailed on May 8, 2023, 9 pages.

*Primary Examiner* — Diedra McQuitery
(74) *Attorney, Agent, or Firm* — Jeremiah J. Baunach; Frontier IP Law PLLC

(57) ABSTRACT

Systems and methods electronically tag received data associated with an entity with an electronic tag including an identifier uniquely associated with the entity. The system may electronically store the received data such that the received data is identifiable via the electronic tag. Then, when a request for deletion of all the entity's data is made by the particular entity, it is fulfilled with much less effort, namely by searching for elements with that entity's tag. Whenever that data is copied, transformed, or derivative data is made, the system copies the electronic tag with it. Thus, even when the data is copied or modified, it can be more efficiently identified as being associated with the particular entity. In some embodiments, the tagging includes electronically recording an association of the electronic tag with the received data as a transaction on a blockchain, the transaction on the blockchain being associated with the electronic tag and with the received data.

12 Claims, 12 Drawing Sheets

(56) References Cited

U.S. PATENT DOCUMENTS

| | | | |
|---|---|---|---|
| 2012/0089699 A1* | 4/2012 | Cholas | H04L 12/2812 |
| | | | 709/217 |
| 2013/0013471 A1 | 1/2013 | Fishman | |
| 2018/0192292 A1* | 7/2018 | Coney | H04W 12/065 |
| 2019/0122384 A1 | 4/2019 | Ertle | |
| 2019/0188814 A1* | 6/2019 | Kreitzer | G06F 21/6254 |
| 2020/0119906 A1* | 4/2020 | Das | H04L 9/3239 |
| 2020/0302082 A1* | 9/2020 | Carteri | G06F 21/6245 |
| 2022/0005092 A1 | 1/2022 | Agrawal et al. | |

* cited by examiner

SYSTEMS AND METHODS FOR ELECTRONICALLY TRACKING CLIENT DATA

TECHNICAL FIELD

The technical field relates to computer networks, and particularly to networked automated systems for electronically tracking client data.

BRIEF SUMMARY

The present description gives instances of computer systems, devices and storage media that may store programs and methods. Embodiments of the system may electronically tag received data associated with an entity with an electronic tag including an identifier uniquely associated with the entity. The system may electronically store the received data such that the received data is identifiable via the electronic tag. Then, when a request for deletion is made by the particular entity, it is fulfilled with much less effort, namely by searching for elements with that entity's tag. Whenever that data is copied, transformed, or derivative data is made, the system copies the electronic tag with it. Thus, even when the data is copied or modified, it can be more efficiently identified as being associated with the particular entity.

Therefore, the systems and methods described herein for electronically tracking client data improve the functioning of computer or other hardware, such as by reducing the processing, storage, and/or data transmission resources needed to perform various tasks, including automatically identifying and electronically deleting all client data, thereby enabling the tasks to be performed by less capable, capacious, and/or expensive hardware devices, enabling the tasks to be performed with less latency and/or preserving more of the conserved resources for use in performing other tasks or additional instances of the same task.

As shown above and in more detail throughout the present disclosure, the present disclosure provides technical improvements in computer networks and existing computerized systems to facilitate availability, accuracy and efficiency of computing resources to perform client data tracking.

These and other features and advantages of the claimed invention will become more readily apparent in view of the embodiments described and illustrated in this specification, namely in this written specification and the associated drawings.

BRIEF DESCRIPTION OF THE SEVERAL VIEWS OF THE DRAWINGS

The components in the drawings are not necessarily drawn to scale relative to each other. Like reference numerals designate corresponding parts throughout the several views.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, that embodiments of the inventive subject matter may be practiced without these specific details. In general, well-known structures and methods associated with underlying technology have not been shown or described in detail to avoid unnecessarily obscuring descriptions of the preferred embodiments.

Figure 1:
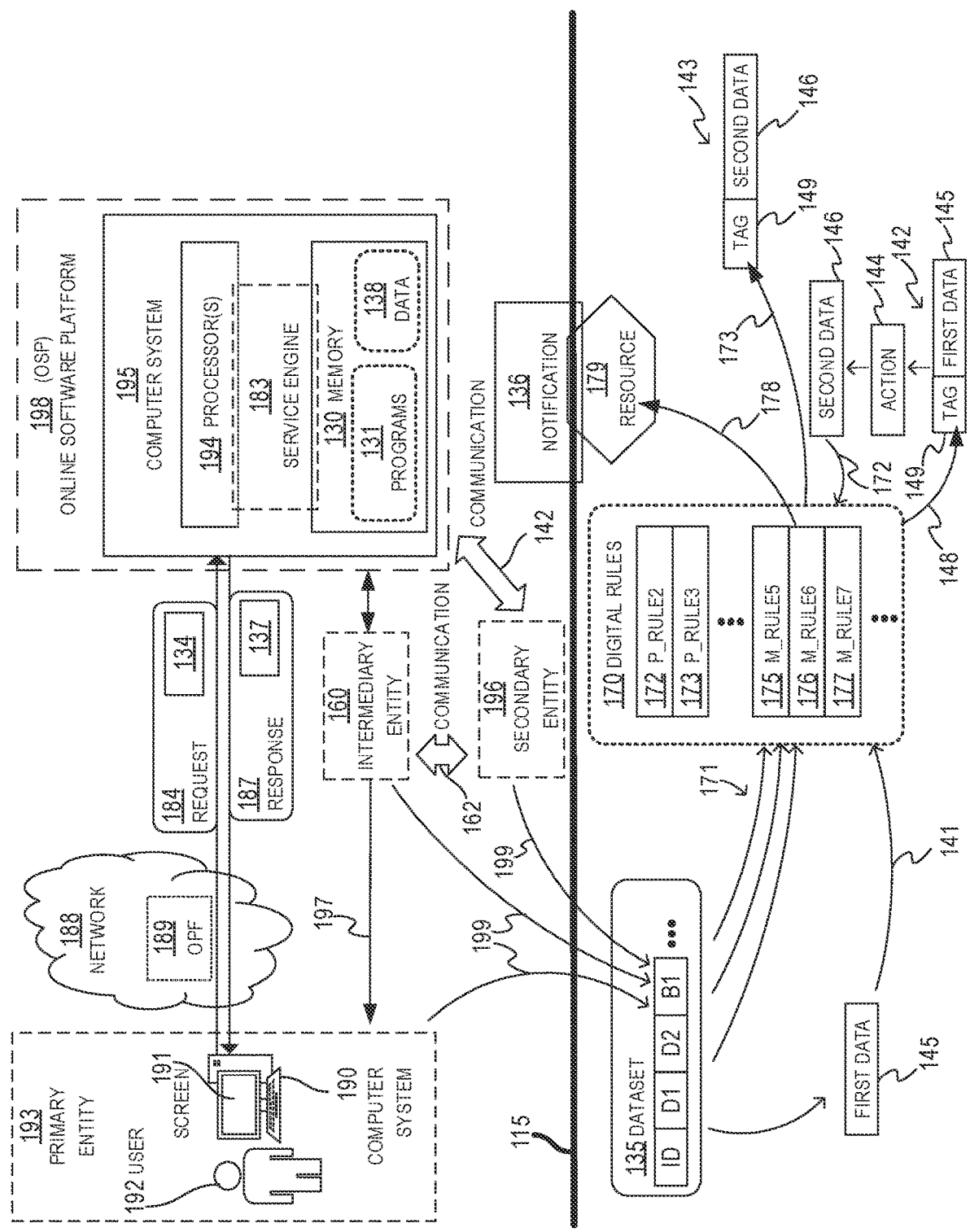
FIG. 1 is a diagram showing sample aspects of embodiments of the present disclosure that are improvements in automated computerized systems.

FIG. 1 is a diagram showing sample aspects of embodiments of the present disclosure. In particular, in an example embodiment, an online software platform (OSP) determines, via the service engine 183, a resource based on applying digital rules 170 to a dataset 135 of a client, such as primary entity 193. The OSP 198 may use data received via communication network 188 from a variety of sources, such as, for example, primary entity 193, secondary entity 196 and intermediary entity 160, and other entities and systems. In many instances, the primary entity 193 may provide certain data (e.g., personal, confidential or sensitive information) that comprises or is part of the dataset 135 which the primary entity 193 at some point may request the OSP 198 to delete or modify (e.g., via request 184). In response to the electronic request to delete or modify all of such data associated with or provided by primary entity 193, in various embodiments, the OSP 198 may electronically track such data via electronically tagging such data it receives, and causing that tag to automatically follow such data whenever it is electronically copied or modified within the OSP 18, as is explained in further detail herein.

A thick line 115 separates this diagram, although not completely or rigorously, into a top portion and a bottom portion. Above the line 115 the emphasis is mostly on entities, components, their relationships, and their interactions, while below the emphasis is mostly processing of data that takes place often within one or more of the components above the line 115.

Above the line 115, a sample computer system 195 according to embodiments is shown. The computer system 195 has one or more processors 194 and a memory 130. The memory 130 stores programs 131 and data 138. The one or more processors 194 and the memory 130 of the computer system 195 thus implement a service engine 183. Additional implementation details for the computer system 195 are given later in this document.

The computer system 195 can be located in "the cloud." In fact, the computer system 195 may optionally be implemented as part of an OSP 198. The OSP 198 can be configured to perform one or more predefined services, for example, via operations of the service engine 183. Such services can be searches, determinations, computations, verifications, notifications, the transmission of specialized information, including data that effectuates payments or remits resources, data representing prediction values (e.g., based on the data that effectuates payments or remits resources), the generation and transmission of documents, the online accessing other systems to effect registrations, and so on, including what is described in this document. Such services can be provided as a Software as a Service (Saas).

A user 192 may be standalone. The user 192 may use a computer system 190 that has a screen 191, on which User Interfaces (UIs) may be shown. Additional sample implementation details for the computer system 190 are given later in this document. In embodiments, the user 192 and the computer system 190 are considered part of a primary entity 193, which can be referred to also merely as entity. In such instances, the user 192 can be an agent of the entity 193, and even within a physical site of the entity 193, although that is not necessary. In embodiments, the computer system 190 or other device of the user 192 or the entity 193 are client devices for the computer system 195.

The computer system 190 may access the computer system 195 via a communication network 188, such as the internet. In particular, the entities and associated systems of FIG. 1 may communicate via physical and logical channels of the communication network 188. For example, information may be communicated as data using the Internet Protocol (IP) suite over a packet-switched network such as the Internet or other packet-switched network, which may be included as part of the communication network 188. The communication network 188 may include many different types of computer networks and communication media including those utilized by various different physical and logical channels of communication, now known or later developed. Non-limiting media and communication channel examples include one or more, or any operable combination of: fiber optic systems, satellite systems, cable systems, microwave systems, asynchronous transfer mode ("ATM") systems, frame relay systems, radio frequency ("RF") systems, telephone systems, cellular systems, other wireless systems, and the Internet. In various embodiments the communication network 188 can be or include any type of network, such as a local area network (LAN), a metropolitan area network (MAN), a wide area network (WAN), a private or public wireless cellular network (e.g., a fifth generation (5G) wireless network) or the internet.

Downloading or uploading may be permitted from one of these two computer systems to the other, and so on. Such accessing can be performed, for instance, with manually uploading files, like spreadsheet files, etc. Such accessing can also be performed automatically as shown in the example of FIG. 1. The computer system 190 and the computer system 195 may exchange requests and responses with each other. Such can be implemented with a number of architectures.

In one such architecture, a device remote to the service engine 183, such as computer system 190, may have a certain application (not shown) and a connector (not shown) that is a plugin that sits on top of that certain application. The connector may be able to fetch from the remote device the details required for the service desired from the OSP 198, form an object or payload 134, and then send or push a request 184 that carries the payload 134 to the service engine 183 via a service call. The service engine 183 may receive the request 184 with the payload 134. The service engine 183 may then apply digital rules 170 to the payload 134 to determine a requested resource 179 and/or prediction value 149, form a payload 137 that is an aspect of the resource 179 and/or prediction value 149, and then push, send, or otherwise cause to be transmitted a response 187 that carries the payload 137 to the connector. The connector reads the response 187, and forwards the payload 137 to the certain application.

In an alternative such architecture, a device remote to the service engine 183, such as computer system 190, may have a particular application (not shown). In addition, the computer system 195 may implement a REST (Representational State Transfer) API (Application Programming Interface) (not shown). REST or RESTful API design is designed to take advantage of existing protocols. While REST can be used over nearly any protocol, it usually takes advantage of HTTP (Hyper Text Transfer Protocol) when used for Web APIs. This alternative architecture enables the primary entity 193 to directly consume a REST API from their particular application, without using a connector. The particular application of the remote device may be able to fetch internally from the remote device the details required for the service desired from the OSP 198, and thus send or push the request 184 to the REST API. In turn, the REST API talks in background to the service engine 183. Again, the service engine 183 determines the requested resource 179, and sends an aspect of it back to the REST API. In turn, the REST API sends the response 187 that has the payload 137 to the particular application.

Moreover, in some embodiments, data from the computer system 190 and/or from the computer system 195 may be stored in an Online Processing Facility (OPF) 189 that can run software applications, perform operations, and so on. In such embodiments, requests and responses may be exchanged with the OPF 189, downloading or uploading may involve the OPF 189, and so on. In such embodiments, the computer system 190 and any devices of the OPF 189 can be considered to be remote devices, at least from the perspective of the computer system 195.

In some instances, the user 192 or the primary entity 193 may have instances of relationships with secondary entities. Only one such secondary entity 196 is shown. However, additional secondary entities may be present in various other embodiments. In this example, the primary entity 193 has a relationship instance 197 with the secondary entity 196 via an intermediary entity 160 using communication 162 between the intermediary entity 160 and the secondary entity 196. For example, the communication 162 between the intermediary entity 160 and the secondary entity 196 may be made over network 188.

In some instances, the user 192, the primary entity 193 and/or the intermediary entity 160 may have data about one or more secondary entities, for example via relationship instances of the user 192 or primary entity with the secondary entity 196. Also, the intermediary entity 160 and/or secondary entity 196 may have data about the primary entity 193, for example via relationship instances of the user 192 or primary entity 193 with the intermediary entity 160 and/or secondary entity 196. The primary entity 193, the intermediary entity 160, and/or the secondary entity 196 may be referred to as simply entities. One of these entities may have one or more attributes. Such an attribute of such an entity may be any one of its name, type of entity, a physical or geographical location such as an address, a contact information element, an affiliation, a characterization of another entity, a characterization by another entity, an association or relationship with another entity (general or specific instances), an asset of the entity, a declaration by or on behalf of the entity, and so on.

In embodiments, the computer system 195 receives one or more datasets. A sample received dataset 135 is shown below the line 115. The dataset 135 may be received by the computer system 195 in a number of ways. In some embodiments, one or more requests may be received by the computer system 195 via a network. In this example, a request 184 is received by the computer system 195 via the network 188. The request 184 has been transmitted by the remote computer system 190. The received one or more requests can carry payloads. In this example, the request 184 carries a payload 134. In such embodiments, the one or more payloads may be parsed by the computer system 195 to extract the dataset. In this example, the payload 134 can be parsed by the computer system 195 to extract the dataset 135. In this example the single payload 134 encodes the entire dataset 135, but that is not required. In fact, a dataset can be received from the payloads of multiple requests. In such cases, a single payload may encode only a portion of the dataset. And, of course, the payload of a single request may encode multiple datasets. Additional computers may be involved with the network 188, some beyond the control of the user 192 or OSP 198, and some within such control.

The dataset 135 has values that can be numerical, alphanumeric, Boolean, and so on, as needed for what the values characterize. For example, an identity value ID may indicate an identity of the dataset 135, so as to differentiate it from other such datasets. At least one of the values of the dataset 135 may characterize an attribute of a certain one of the entities 193 and 196, and/or the intermediary entity 160 as indicated by arrows 199. (It should be noted that the arrows 199 describe a correspondence, but not the journey of data in becoming the received dataset 135.) For instance, a value D1 may be the name of the certain entity, a value D2 may be for relevant data of the entity, and so on. Plus, an optional value B1 may be a numerical base value for an aspect of the dataset, and so on. The aspect of the dataset may be the aspect of the value that characterizes the attribute, an aspect of the reason that the dataset was created in the first place, an indication of whether the relationship instance 197 with the secondary entity 196 is via the intermediary entity 160, an indication of whether a resource associated with the relationship instance 197 is received via the intermediary entity 160, an indication of an identity or other characteristic of the intermediary entity 160, and so on. The dataset 135 may further have additional such values, as indicated by the horizontal dot-dot-dot to the right of the dataset 135. In some embodiments, each dataset, such as dataset 135 corresponds to one relationship instance. In some embodiments, the dataset 135 may correspond to a plurality of relationship instances and include such respective values for each respective relationship instance of the plurality of relationship instances. In some embodiments, the dataset 135 has values that characterize attributes of each of the primary entity 193, the secondary entity 196 and the intermediary entity 160, but that is not required. In some embodiments, the primary entity 193 may be the intermediary entity 160 or secondary entity 196 and communications described herein such as the request 184 and response 187 may be additionally or instead between the intermediary entity 160 or secondary entity 196 and the computer system 195.

In embodiments, stored digital rules 170 may be accessed by the computer system 195. These rules 170 are digital in that they are implemented for use by software. For example, these rules 170 may be implemented within programs 131 and data 138. The data portion of these rules 170 may alternately be implemented in memories in other places, which can be accessed via the network 188. These rules 170 may be accessed responsive to receiving a dataset, such as the dataset 135.

The digital rules 170 may include main rules, which can thus be accessed by the computer system 195. In this example, three sample digital main rules are shown explicitly, namely M_RULE5 175, M_RULE6 176, and M_RULE7 177. In this example, the digital rules 170 also include digital precedence rules P_RULE2 172 and P_RULE3 173, which can thus be further accessed by the computer system 195. The digital rules 170 may include additional rules and types of rules, as suggested by the vertical dot-dot-dots.

In embodiments, a certain one of the digital main rules may be identified from among the accessed stored rules by the computer system 195. In particular, values of the dataset 135 can be tested, according to arrows 171, against logical conditions of the digital main rules, as described later in this document. In this example, the certain main rule M_RULE6 176 is thus identified, which is indicated also by the beginning of an arrow 178 that is described in more detail later in this document. Identifying may be performed in a number of ways, and depending on how the digital main rules are implemented. An example is now described.

Figure 2:
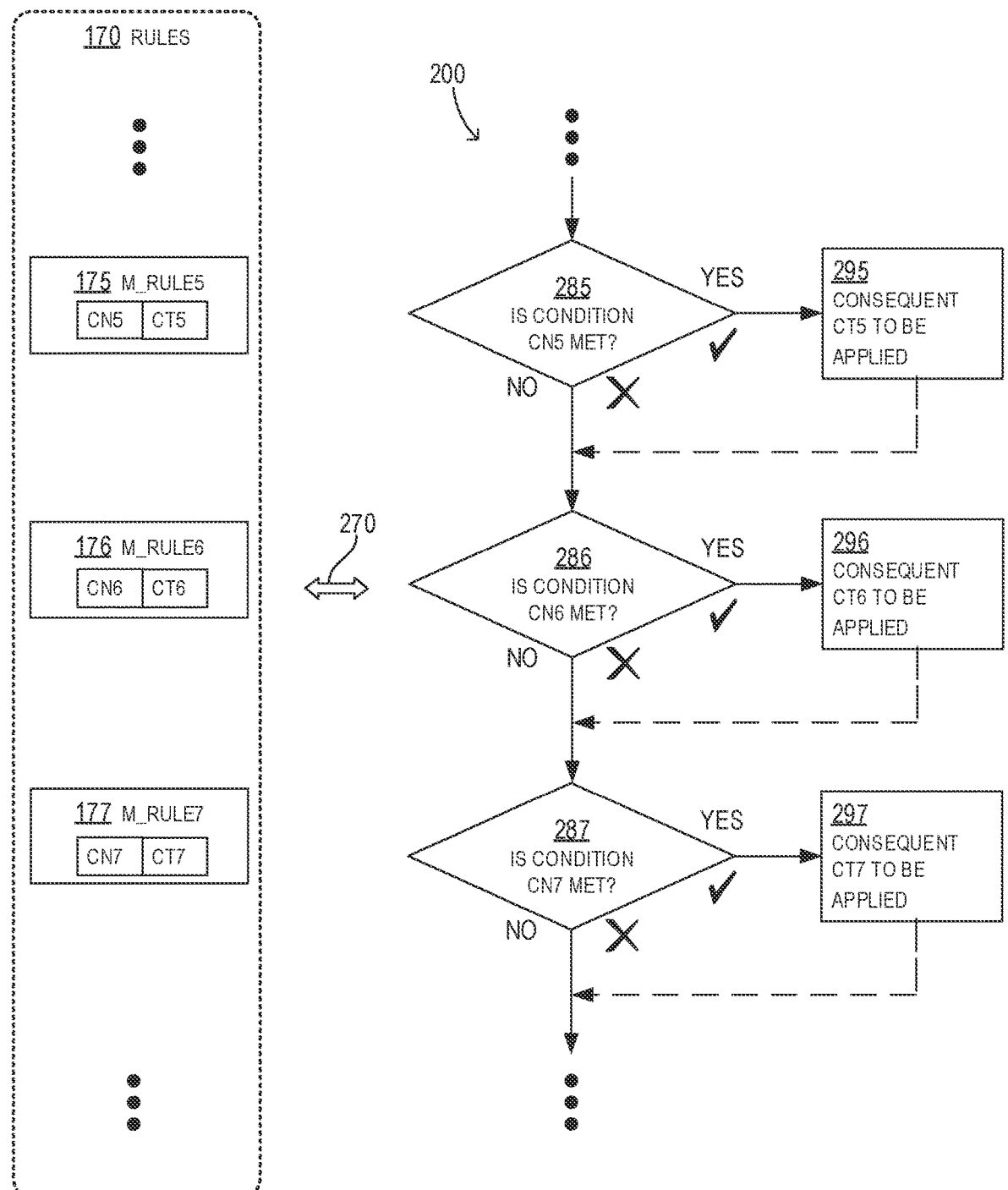
FIG. 2 is a diagram that repeats some of the digital main rules of FIG. 1 in more detail, and juxtaposes them with a flowchart portion for a sample method of how it may be recognized that conditions of a certain digital main rule can be met for its consequent to be applied, all according to embodiments of the present disclosure, and is an improvement in automated computerized systems.

Referring now also to FIG. 2, some of the digital main rules of digital rules 170 are repeated from FIG. 1 in more detail. In addition, according to an arrow 270, these digital main rules are shown juxtaposed with a flowchart portion 200. In embodiments, some of the digital main rules can be expressed in the form of a logical "if-then" statement, such as: "if P then Q". In such statements, the "if" part, represented by the "P", is called the condition, and the "then" part, represented by the "Q", is called the consequent. Therefore, at least some of the digital main rules include respective conditions and respective consequents associated with the respective conditions, respectively. And, for a certain digital main rule, if its certain condition P is met, then its certain consequent Q is what happens or becomes applied. One or more of the digital rules 170 may have more than one conditions P that both must be met, and so on. And some of these digital rules 170 may be searched for, and grouped, according first to one of the conditions, and then the other. In this example, the digital main rules M_RULE5 175, M_RULE6 176, and M_RULE7 177 of FIG. 1, include respective conditions CN5, CN6, CN7, and respective consequents CT5, CT6, CT7 associated with the respective conditions CN5, CN6, CN7, respectively.

In embodiments, therefore, identifying is performed by recognizing, by the computer system 195, that a certain condition of a certain one of the accessed digital main rules is met by one or more of the values of the dataset. An example of the operations of recognizing that a condition is met and thus identifying an applicable rule is shown by flowchart portion 200 of FIG. 2. According to successive decision diamonds 285, 286, 287, it is determined whether or not conditions CN5, CN6, CN7 are met by at least one of the values of the dataset, respectively. If the answer is NO, then execution may proceed to the next diamond. If the answer is YES then, according to operations 295, 296, 297, it is further determined that the respective consequents CT5, CT6, CT7 are to be applied, and then execution may proceed to the next diamond in the flowchart portion. A consequent that is to be applied could be, for example, flagged as TRUE.

From what was mentioned in connection with FIG. 1, the certain M_RULE6 176 was thus identified. With reference to FIG. 2, the identification may have happened at operation 286 of the flowchart portion 200, at which time it was recognized that condition CN6 was met by a value of the dataset 135. This made: the condition CN6 be the certain condition, the digital main rule M_RULE6 176 be the certain digital main rule, and the consequent CT6 be the certain consequent of the certain digital main rule M_RULE6 176. And the certain consequent CT6 is associated with the certain condition CN6, since both are included by the certain digital main rule 176. Therefore, according to operation 296, consequent CT6 is what happens or becomes applied, as described below.

A number of examples are possible for how to recognize that a certain condition of a certain digital rule is met by at least one of the values of the dataset. For instance, the certain condition could define a boundary of a region that is within a space. The region could be geometric, and be within a larger space and may include political boundaries. For example, the region could be geographic, within the space of a city, a county, a state, a country, a continent or the earth. The boundary of the region could be defined in terms of numbers according to a coordinate system within the space. In the example of geography, the boundary could be defined in terms of groups of longitude and latitude coordinates. In such embodiments, the certain condition could be met responsive to the characterized attribute of the dataset being in the space and within the boundary of the region instead of outside the boundary. For instance, the attribute could be a location of the entity, and the one or more values of the dataset 135 that characterize the location could be one or more numbers or an address, or longitude and latitude. The condition can be met depending on how the one or more values compare with the boundary. For example, the comparison may reveal that the location is in the region instead of outside the region. The comparison can be made by rendering the characterized attribute in units comparable to those of the boundary. For example, the characterized attribute could be an address that is rendered into longitude and latitude coordinates, and so on.

The above embodiments are only examples, and not limiting. For instance, the example of FIG. 2 suggests that there is a one-to-one correspondence of the conditions with the associated consequents, but that is not necessary. In fact, a single consequent may be associated with two or more conditions, and two or more consequents may be associated with a single condition. Of course, all such can be shown as additional rules, with groups of them having the same condition or consequent.

For another instance, once it is determined that a consequent is to be applied, execution may even exit the flowchart portion 200. Or, as shown, it may be determined that more than one of the digital main rules is to be applied. In particular, operation 286 may give the answer YES such that consequent CT6 is to be applied, and operation 287 may also give the answer YES such that consequent CT7 is to be applied.

Where more than one of the digital main rules are found that could be applied, there are additional possibilities. For instance, the computer system 195 of FIG. 1 may further access at least one stored digital precedence rule, such as P_RULE2 172 or P_RULE3 173. Accordingly, the certain digital main rule may be thus identified also from the digital precedence rule. In particular, the digital precedence rule may decide which one or more of the digital main rules is to be applied. To continue the previous example, if a value of the dataset 135 that characterizes a location, and the location is within multiple overlapping regions according to multiple rules, the digital precedence rule may decide that all of them are to be applied, or less than all of them are to be applied. Equivalent embodiments are also possible, where digital precedence rules are applied first to limit the iterative search of the flowchart portion 200, so as to test the applicability of fewer than all the rules according to arrows 171.

Another example for how to recognize that a certain condition of a certain digital rule is met by at least one of the values of the dataset 135 is that the certain condition could be regarding whether a particular piece of data originating from the dataset 135 or another source is identified, such as via a tag 149 or otherwise, as being associated with primary entity 193 or another particular entity, such as intermediary entity 160 or secondary entity 196. If such a condition is met, the digital rules 170 may indicate to store the tag 149 associated with or otherwise electronically attached to such data upon receiving the data and/or when an action 144 (e.g., copying or modifying) is performed on the data.

In embodiments, a resource may be produced for the dataset, by the computer system 195 applying the certain consequent of the certain digital main rule. The resource can be, or be a part of, a computational result, a document, an item of value, a representation of an item of value, etc., made, created or prepared for the user 192, the primary entity 193, the secondary entity 196, the intermediary entity 160, etc., on the basis of the attribute. As such, in some embodiments, the resource is produced by a determination and/or a computation. In the example of FIG. 1, a resource 179 is produced for the dataset 135, by the computer system 195 applying the certain M_RULE6 176, and in particular its certain consequent CT6, as indicated by the arrow 178. In fact, sometimes applying the consequent is more simply stated as "applying the rule".

The resource may be produced in a number of ways. For example, the certain consequent can be applied to one or more of the values of the dataset 135. For instance, one of the values of the dataset 135 can be a numerical base value, e.g. B1, that encodes an aspect of the dataset 135, as mentioned above. In such cases, applying the certain consequent may include performing a mathematical operation on the base value B1. For example, applying the certain consequent may include multiplying the base value B1 with a number indicated by the certain consequent. Such a number can be, for example, a percentage, e.g., 1.5%, 3%, 5%, and so on. Such a number can be indicated directly by the certain rule, or be stored in a place indicated by the certain rule, and so on.

As mentioned above, in some embodiments two or more digital main rules may be applied. For instance, referring again to FIG. 1, the computer system 195 may recognize that an additional condition of an additional one of the accessed digital main rules 170 is met by at least one of the values of the dataset 135. In this example there would be no digital precedence rules, or the available digital precedence rules would not preclude both the certain digital main rule and the additional digital main rule from being applied concurrently. Such an additional digital main rule would have an additional consequent.

In such embodiments, the resource may be produced by the computer system applying the certain consequent and the additional consequent. For instance, where the base value B1 is used, applying the certain consequent may include multiplying the base value B1 with a first number indicated by the certain consequent, so as to compute a first product. In addition, applying the additional consequent may include multiplying the base value B1 with a second number indicated by the additional consequent, so as to compute a second product. And, the resource may be produced by summing the first product and the second product.

In embodiments, a notification, such as notification 136, can be caused to be transmitted, e.g., via the network 188, by the computer system. The notification can be about an aspect of the resource. In the example of FIG. 1, a notification 136 can be caused to be transmitted by the computer system 195, for example as an answer or other response to the received dataset 135. In some embodiments, notification 136 can also or instead be caused to be transmitted by the computer system 195, for example as an answer or other response to data received by the computer system 195 from other external sources, alone or in combination with data from dataset 135. The notification 136 can be about an aspect of the resource 179. In particular, the notification 136 may inform about the aspect of the resource 179, namely that it has been determined, where it can be found, what it is, or at least a portion or a statistic of its content, a rounded version of it, and so on. Of course, the planning should be that the recipient of the notification 136 understands what it is being provided. In such instances a resource need not be produced for the notification 136 to be transmitted. In particular, the notification 136 may inform about the aspect of the prediction resource 179, namely that it has been determined, where it can be found, what it is, or at least a portion or a statistic of its content, a rounded version of it, and so on. Of course, the planning should be that the recipient of the notification 136 understands what it is being provided. The notification 136 can also or instead indicate an action 144 has been performed regarding the first data 145 and/or that all data of the primary entity 193 tracked via tag 149 has been deleted or modified.

The notification 136 can be transmitted to one of an output device and another device. The output device may be the screen of a local user or a remote user. The notification 136 may thus cause a desired image, message, or other such notification to appear on the screen, such as within a Graphical User Interface (GUI) and so on. The other device can be the remote device, from which the dataset 135 was received, as in the example of FIG. 1. In particular, the computer system 195 may cause the notification 136 to be communicated by being encoded as a payload 137, which is carried by a response 187. The response 187 may be transmitted via the network 188 responsive to the received request 184. The response 187 may be transmitted to the computer system 190, or to OPF 189, and so on. As such, the other device can be the computer system 190, or the OPF 189, or the screen 191 of the user 192, and so on. In this example, the single payload 137 encodes the entire notification 136, but that is not required. Similarly with what is written above about encoding datasets in payloads, the notification 136 instead may be provided via two or more payloads, or in other cases the notification 136, and at least one other notification, may be included in the same single payload. Along with the aspect of the resource 179, it can be advantageous to embed in the payload 137 the identity value (ID) and/or one or more values of the dataset 135 and/or the tag 149. This will help the recipient correlate the response 187 to the request 184, and therefore match the received aspect of the resource 179 as the answer or other response to the appropriate dataset or request.

In an example embodiment, there may be a plurality of relationship instances between the primary entity 193 and one or more secondary entities, such as secondary entity 196. In some embodiments, such relationship instances are between the primary entity 193 and one or more secondary entities, such as secondary entity 196, via one or more intermediary entities, such as intermediary entity 160 using communication 162. Each relationship instance may be associated with one or more respective domains of a plurality of domains. Also, each relationship instance may be associated with one or more respective intermediary entities, such as intermediary entity 160, which handles or facilitates creation of the relationship instance using communication 162. For example, a resource associated with the relationship instance 197 may be received by the primary entity 193 via the intermediary entity 160. In various embodiments, a domain may be a region defined by a boundary as discussed above or may be an entity representing or otherwise associated with the region. For example, the region could be geographic, within the space of a city, a county, a state, a country, a continent or the earth. The plurality of relationship instances may result in a requirement that an electronic reporting document associated with the primary entity 193 be prepared regarding an amount of resources due to one or more of the plurality of domains, that the document be sent to one or more of the plurality of domains and that resources possibly be remitted to one or more of the plurality of domains. A domain as used herein may refer to a geographic area or to one or more authorities (or computerized systems controlled by such authorities) that set or define rules or digital rules for such a geographic area or domain as described herein. The OSP 198 may perform or facilitate such electronic actions.

For example, in one embodiment, primary entity 193 may have a relationship instance with secondary entity 196 and that particular relationship instance may be associated with one or more domains and with the particular intermediary entity 160 through which a resource associated with the relationship instance 197 was received by the primary entity 193 from the secondary entity 196. The association of the relationship instance with the one or more domains may be based on a variety of characteristics including, but not limited to: a relationship of one or more of the primary entity and secondary entity with the particular domain; a location of one or more of the primary entity and secondary entity within or associated with the particular domain; a region or location associated with one or more of the primary entity and secondary entity being within or associated with the particular domain; a previous relationship of one or more of the primary entity and secondary entity with the particular domain; a location of items associated with one or more of the primary entity and secondary entity within the particular domain; a number of relationships of one or more of the primary entity and secondary entity with the particular domain; a transfer of items associated with one or more of the primary entity and secondary entity to or from an entity within or associated with the particular domain; a transfer of data associated with one or more of the primary entity and secondary entity to or from an entity within or associated the particular domain, etc. The existence or identification of the relationship instance and/or one or more characteristics of the relationship instance may be defined or represented by values of dataset 135.

In some embodiments, for each relationship instance of the plurality of relationship instances, the OSP 198 electronically identifies a rate to calculate an amount of resource due to one or more respective domains associated with the relationship instance based on a source of a resource received for the relationship instance and the one or more respective domains. For example, the primary entity 193 may send request 184 to the computer system 195 of OSP 198 for services that facilitate remitting resources due to one or more respective domains. The request 184 may include the existence or identification of the relationship instance and/or one or more characteristics of the relationship instance as part of payload 134. The service engine 183 may then apply digital rules 170 to the relationship instance and/or one or more characteristics of the relationship instance to identify or otherwise determine the rate to calculate an amount of resource due to one or more respective domains associated with the relationship instance.

For example, digital precedence rule P_RULE2 172 may decide that rule M_RULE5 175 is to be applied when a particular condition is met. Digital precedence rule P_RULE2 172 may include a condition that indicates if a particular relationship instance is associated with a particular domain, then rule M_RULE5 175 is to be applied. The service engine 183 may determine that the condition is met due to one or more values of dataset 135 indicating the particular relationship instance and that the particular relationship instance is associated with the particular domain. Thus, as a consequent of precedence rule P_RULE2 172, the service engine 183 applies rule M_RULE5 175. Rule M_RULE5 175 may include a condition CN5 that indicates if a particular source of the resource received for that relationship instance is associated with that particular domain, then, as consequent CT5, a particular rate is to be used to calculate an amount of resource due to that particular domain.

Referring again to FIG. 2, at decision diamond 285 it is determined that the condition CN5 is met (i.e., that the particular source of the resource received for that relationship instance is associated with that particular domain) and thus, the particular rate is used to calculate an amount of resource due to that particular domain. Thus, by applying digital rules 170, the service engine 183 identifies the rate to calculate an amount of resource due to one or more respective domains associated with the relationship instance based on a source of a resource received for the relationship instance and the one or more respective domains, and also calculates an amount of resources due to at least one respective domain associated with the relationship instance based on the identified rate. In some embodiments, this calculated amount of resources due may be included by the service engine 183 as part of the resulting requested resource 179 and/or notification 136. The service engine 183 may then form a payload 137 that is an aspect of the resource 179, and then push, send, or otherwise cause to be transmitted a response 187 that carries the payload 137 to a device remote to the service engine 183, such as computer system 190, a device of secondary entity 196 or another secondary entity. Digital rules 170 may include multiple different digital rules for each type of relationship instance and different domains. In various embodiments, the notification 136 may comprise the response 187, or the response 187 may be included in the notification 136.

In may often occur that the primary entity 193 may provide certain data that comprises or is part of the dataset 135 which the primary entity 193 at some point may request the OSP 198 to delete or modify. For example, such information may include one or more of: an electronic document associated with the entity; one or more content items associated with the entity; a category of data associated with the entity; a dataset associated with the entity; a collection of data associated with the entity; a name of the entity; an address of the entity; sales data of the entity; a location of the entity; a social security number of the entity; a tax identifier of the entity; identifying number or code of the entity; a telephone number of the entity, an email address of the entity; contact information for the entity; business data of the entity; user name of the entity; login credentials of the entity; electronic documents of the entity; financial information of the entity; personal information of the entity; confidential information of the entity and personal identifiable information of the entity.

In order to more efficiently fulfill the electronic request to delete or modify all of such data associated with or provided by primary entity 193, in various embodiments, the OSP 198 may electronically track such data via electronically tagging such data it receives, and causing that tag (e.g., tag 149) to automatically follow such data whenever it is electronically copied or modified. For example, in one embodiment, the OSP 198 may electronically associate the received first data 145 with the primary entity 193. The OSP 198 then applies 141 one or more digital rules 170 to electronically tag 148 the received first data 145 with an electronic tag 149 uniquely associated with the primary entity 193, including an identifier uniquely associated with the primary entity 193. The OSP 198 then electronically stores the received first data 145 as tagged data 142, such that the received first data 145 is identifiable via the electronic tag 149. The OSP 198 may then apply 172 one or more digital rules to electronically tag 173 with the electronic tag 149 a second data 146 associated with the primary entity 193 resulting from an action 144 (e.g., copying or modifying) performed on the stored received first data 145, such that the second data 146 associated with the primary entity 193 resulting from the action 144 performed on the stored received first data 145 is also identifiable via the electronic tag 149. The OSP 198 then electronically stores the tagged second data 143 associated with the primary entity 193 resulting from the action 144 performed on the stored received first data 145 such that the second data 146 associated with the primary entity 193 resulting from the action 144 performed on the stored received first data 145 is also identifiable via the electronic tag 149.

When and how to perform such tagging may be indicated by and performed according to one or more digital rules 170 stored by or otherwise accessible by the OSP 198. For example, the automatic electronic tagging of the first data 145 may be performed upon receipt of the first data 145 from the primary entity 193 via dataset 135 according one or more digital rules 170. In one embodiment, the condition indicated by one of the digital rules 170 for tagging the first data 145 with electronic tag 149 associated with primary entity 193 is that the first data 145 must be received from primary entity 193, as indicated by the dataset 135 and/or the request 184. Also, a condition indicated by one of the digital rules 170 for tagging the second data 146 with electronic tag 149 associated with primary entity 193 is that the action 144 is an action performed on data tagged with electronic tag 149 associated with primary entity 193.

Figure 3A:
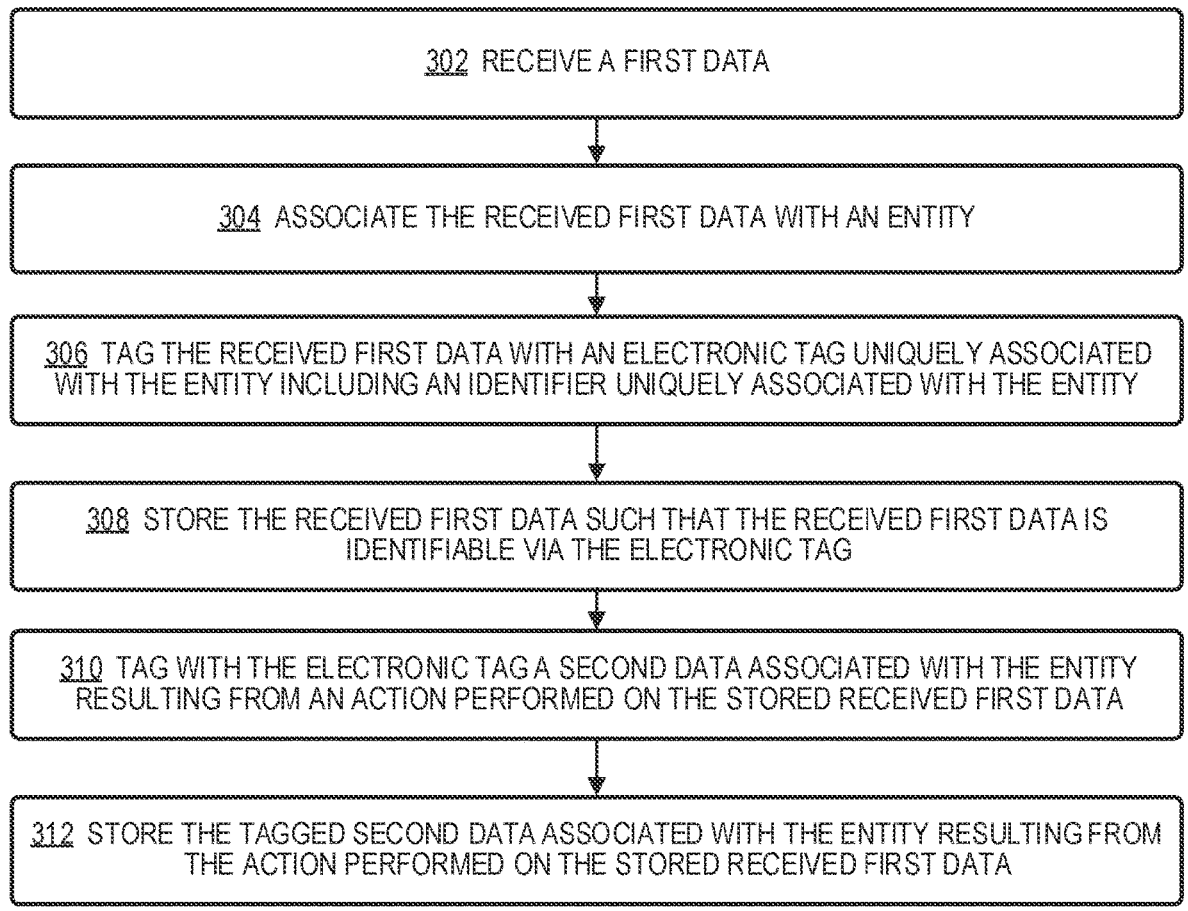
FIG. 3A is a flowchart for illustrating a sample method according to embodiments of the present disclosure that is an improvement in automated computerized systems.

FIG. 3A is a flowchart for illustrating a sample method 300 according to embodiments of the present disclosure that is an improvement in automated computerized systems.

At 302, the OSP 198 electronically receiving a first data.

At 304, the OSP 198 electronically associates the received first data with an entity.

At 306, the OSP 198 electronically tags the received first data with an electronic tag uniquely associated with the entity including an identifier uniquely associated with the entity. The electronic tag may include a unique identifier that is a unique digital code or other string of characters unique to the particular entity. In some embodiments, the unique identifier or electronic tag may have a prefix or other sub-string that identifies the electronic tag as an electronic tag or identifies the type of data that is tagged with the electronic tag.

At 308, the OSP 198 electronically stores the received first data such that the received first data is identifiable via the electronic tag. For example, the tag may be stored in a specific field of a database record that stores the first data. The field may be labeled as a tag field or likewise to identify the field as including the electronic tag associated with the first data. In some embodiments, the tag may be stored as a parameter value in computer code associated with the first data. In some embodiments, the tag may be embedded in an electronic document in which the first data is stored adjacent to or otherwise associated with the first data in the electronic document. The tag may also or instead be used to encrypt or generate a hash of the first data. In various embodiment, the tag may be stored in a data structure that is associated with the first data.

At 310, the OSP 198 electronically tags with the electronic tag a second data associated with the entity resulting from an action performed on the stored received first data such that the second data associated with the entity resulting from the action performed on the stored received first data is also identifiable via the electronic tag. This electronically tagging the second data may be according to one or more digital rules. The action may include, but is not limited to, copying, modifying or moving the data.

In particular, in one embodiment, the OSP 198 may copy the electronic tag along with the stored received first data, or any piece of the stored received first data identified as unique to the entity, whenever the stored received first data, or any piece of the stored received first data identified as unique to the entity, is moved or copied to a different database or electronic document than in which the stored received first data was originally stored, according to a first digital rule. For example, if the stored received first data is an address, then the street name and house number piece of that address is also identified as unique to the entity, even if the city name and zip code pieces are not. Thus, if the street name and house number piece is moved or copied to a different database than in which the full address is stored, then the electronic tag is copied along with the street name and house number piece that is moved or copied to a different database.

Furthermore, the OSP 198 may copy the tag along with the stored received first data, or any piece of the stored received first data identified as unique to the entity, whenever the stored received first data, or any piece of the stored received first data identified as unique to the entity, is modified and then moved or copied to a different database than in which the stored received first data was originally stored, according to a second digital rule.

Also, the OSP 198 may maintain the electronic tag as associated with the stored received first data, or any piece of the stored received first data identified as unique to the entity, whenever the stored received first data, or any piece of the stored received first data identified as unique to the entity, is modified, according to a third digital rule. In such embodiments, each piece of the stored received first data identified as unique to the entity may be identified as unique to the entity via the electronic tag also being associated, according to a fourth digital rule, with the piece of the stored received first data identified as unique to the entity. For example, if the stored received first data is an address, then the street name and house number piece of that address is also identified as unique to the entity, even if the city name and zip code pieces alone are not identified as unique to the entity. Thus, if the street name and house number piece is modified (e.g., street name changed from "123 Main St." to "123 Main Street"), then the same electronic tag that is used to tag the full address, and that is also used to tag the street name and house number piece of that address, is maintained and used to tag the modified street name and house number piece "123 Main Street".

At 312, the OSP 198 electronically stores the tagged second data associated with the entity resulting from the action performed on the stored received first data such that the second data associated with the entity resulting from the action performed on the stored received first data is also identifiable via the electronic tag.

Figure 3B:
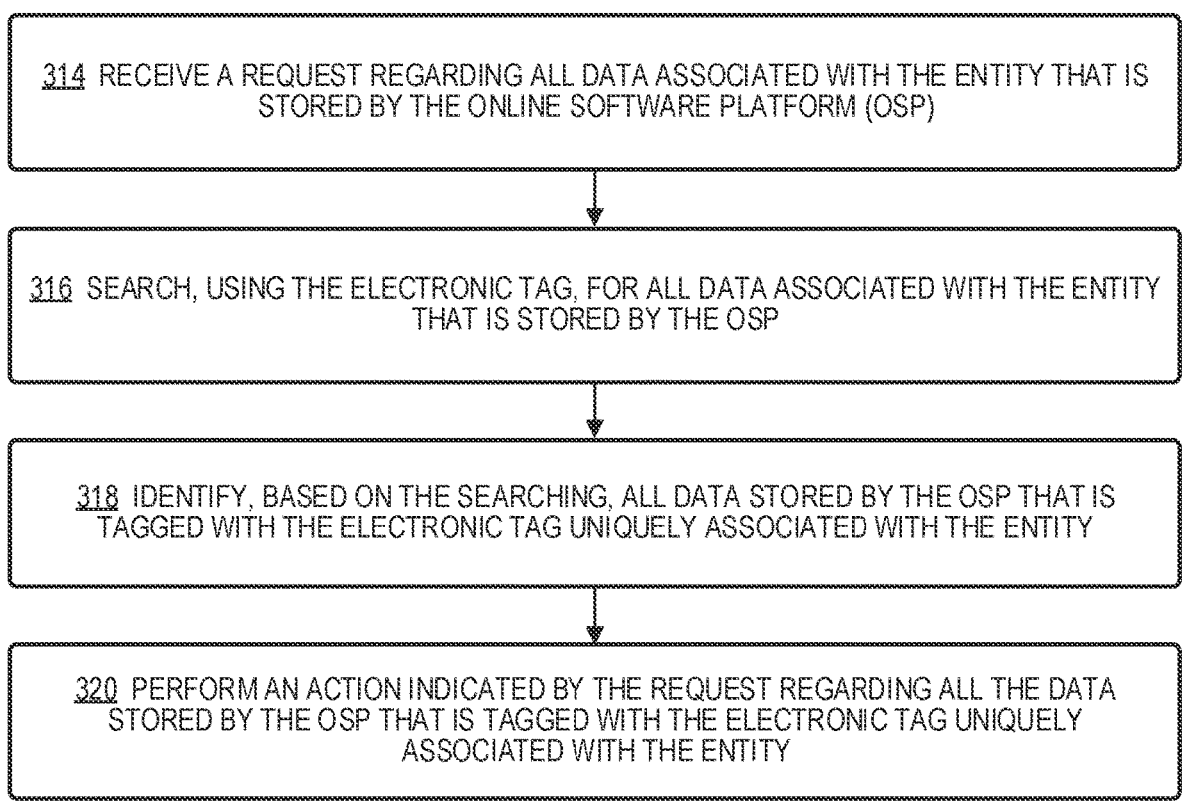
FIG. 3B is a flowchart for illustrating a sample method for performing an action regarding all data stored by an online software platform (OSP) that is tagged with an electronic tag uniquely associated with an entity according to embodiments of the present disclosure, and is an improvement in automated computerized systems.

In some embodiments, the electronically tagging the received data includes electronically recording an association of the electronic tag with the received data as a transaction on a blockchain. The transaction on the blockchain is associated with the electronic tag and with the received data. The electronically tagging with the electronic tag the second data associated with the entity resulting from an action performed on the stored received first data then includes electronically recording the action performed on the stored received first data as an additional transaction on the blockchain. The additional transaction on the block chain is associated with the electronic tag and with the second data associated with the entity resulting from the action performed on the stored received first data FIG. 3B is a flowchart for illustrating a sample method 303 for performing an action regarding all data stored by an online software platform (OSP) that is tagged with an electronic tag uniquely associated with an entity according to embodiments of the present disclosure, and is an improvement in automated computerized systems.

At 314, the OSP 198 electronically receives a request regarding all data associated with the entity that is stored by the OSP 198. For example, the action indicated by the request may be electronic deletion of all the data stored by the OSP 198 that is associated with the entity. The action indicated by the request may instead be to modify all the data stored by the OSP 198 that is associated with the entity. In some embodiments, one entity may have different tags associated with the entity for different types of data associated with the entity stored by the OSP 198. Thus, the request may indicate to modify all of the specific type of data associated with the entity identified by the tag. In some embodiments, the action indicated by the request is electronically sending a report regarding all the data stored by the OSP 198 that is associated with the entity. The report may include a listing or identification of all such data identified by the tag associated with the entity, or a listing or identification of all such data that had just been deleted that was identified by the tag associated with the entity.

At 316, the OSP 198, in response to receiving the request, electronically searches, using the electronic tag, for all data associated with the entity that is stored by the OSP. For example, such a search may include all electronic databases, electronic documents, data structures and electronic storage areas of the OSP 198 or accessible by the OSP 198.

At 318, the OSP 198 electronically identifies, based on the searching, all data stored by the OSP 198 that is tagged with the electronic tag uniquely associated with the entity.

At 320 the OSP 198 electronically performs an action indicated by the request regarding all the data stored by the OSP 198 that is tagged with the electronic tag uniquely associated with the entity.

Figure 3C:
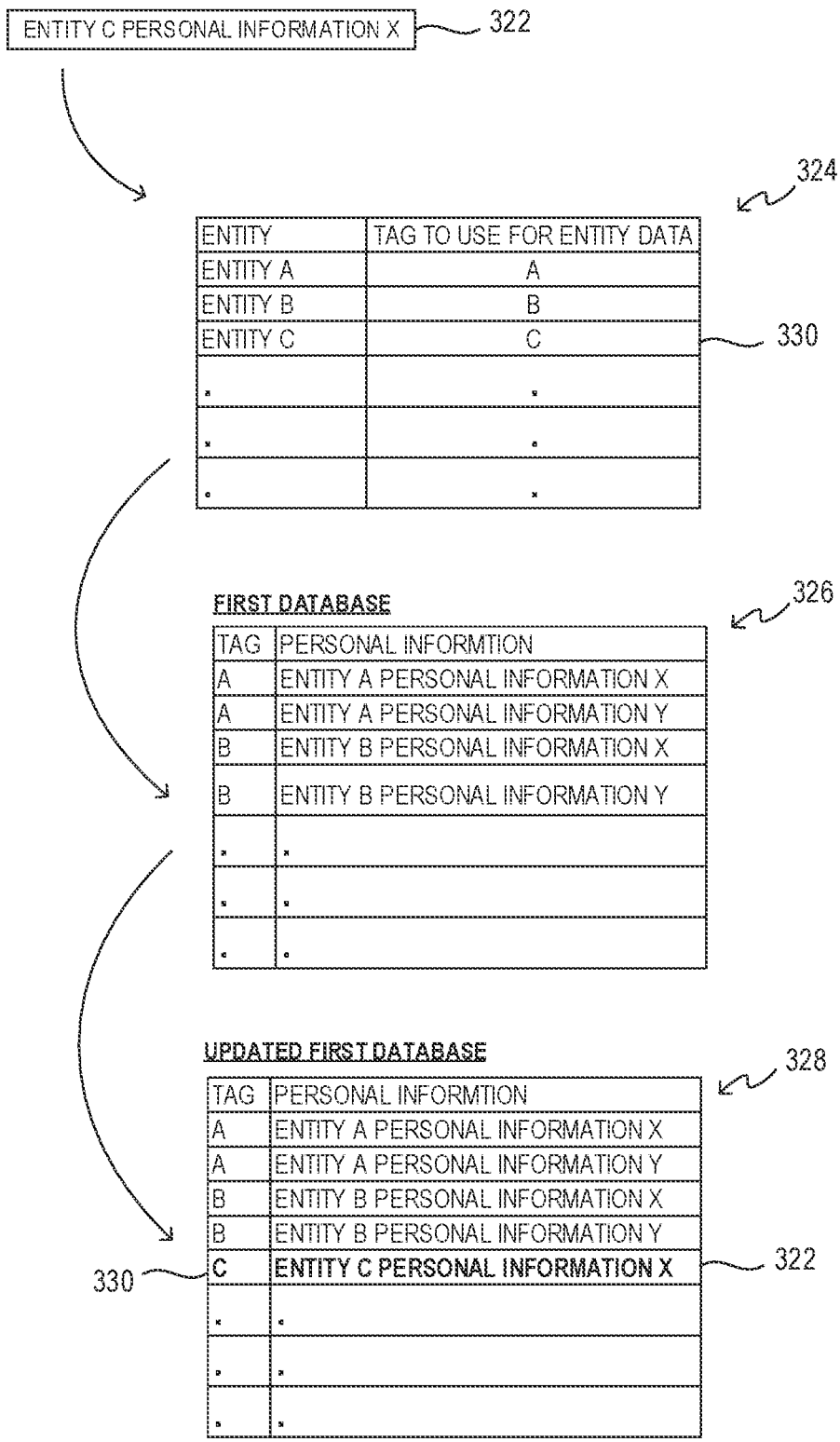
FIG. 3C is a data flow diagram illustrating an example of tagging and storing a piece of personal information associated with an entity according to embodiments of the present disclosure, and is an improvement in automated computerized systems.

FIG. 3C is a data flow diagram illustrating an example of tagging and storing a piece of personal information associated with an entity according to embodiments of the present disclosure, and is an improvement in automated computerized systems.

In the example shown, example "Entity C Personal Information X" 322 (e.g., an address of entity C) is received by the OSP 198, e.g., as part of dataset 135 of FIG. 1. In response to receiving "Entity C Personal Information X" 322, the service engine 183 of the OSP 198 determines if an electronic tag exists for entity C in an electronic registry 324 that associates electronic tags with the respective entity. If an electronic tag does not exist for entity C in an electronic registry 324, then the service engine 183 of the OSP 198 generates an electronic tag that includes an identifier unique to entity C and stores the electronic tag in the electronic registry 324 associated with entity C (shown as tag "C" 330 in electronic registry 324 as associated with entity C). The electronic registry 324 may be stored as part of data 138 in memory 138 of computer system 195 shown in FIG. 1, or may be stored in any other storage area or device (local or remote) accessible by the OSP 198.

The service engine 183 may then electronically store "Entity C Personal Information X" 322 in a first database 326 of the OSP 198 in a record in updated first database 328 with electronic tag "C" 330 such that the "Entity C Personal Information X" 322 is identifiable in the updated database 328 via the electronic tag "C' 330. In particular, the service engine 183 may subsequently be able to search the updated first database 328 using the electronic tag "C" 330 as a search parameter and find "Entity C Personal Information X" 322 and identify it as being associated with entity C. In some embodiments, the service engine 183 may also go back to attempt to find previously stored untagged data associated with a particular existing client, such as a particular entity (e.g., by using the particular entity's name or other identifier(s)) and tag that data with a unique electronic tag associated with the particular entity.

At some point, the service engine 183 may modify "Entity C Personal Information X" 322. For example, the original "Entity C Personal Information X" 322 may be an address:

John Doe
300 Acre Lane West
Nowhere, WA 98103

An address validation service of the OSP 198 may automatically improve the address to:

John Doe
300 Acre Lane West
Nowhere Island, WA 98103

In such an instance as above, the service engine 183 will maintain the electronic tag "C" 330 associated with "Entity C Personal Information X" 322 such that the improved address is still identifiable via a search in the updated database 328 via the electronic tag "C" 330.

Figure 3D:
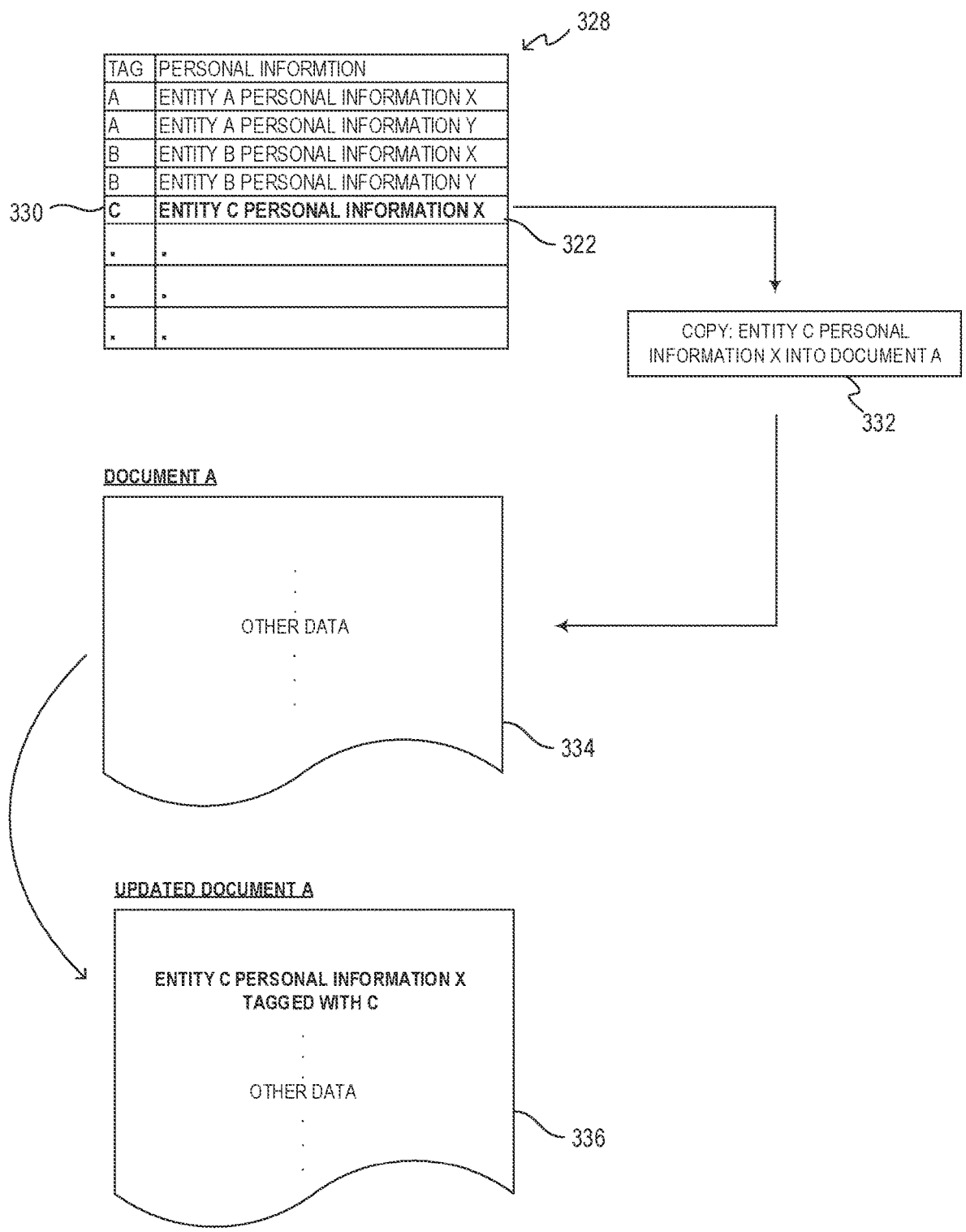
FIG. 3D is a data flow diagram illustrating an example of how a tag follows tagged personal information associated with a particular entity when copied into another location, such as into a document, according to embodiments of the present disclosure, and is an improvement in automated computerized systems.

FIG. 3D is a data flow diagram illustrating an example of how a tag follows tagged personal information associated with a particular entity when copied into another location, such as into a document, according to embodiments of the present disclosure, and is an improvement in automated computerized systems.

Continuing with the previous example of FIG. 3C, a request 332 is received by the OSP 198 to copy "Entity C Personal Information X" 322 in updated database 328 into Document A 334, or an internal operation of the service engine 183 causes "Entity C Personal Information X" 322 in updated database 328 to be copied into document A 334. As shown, "Entity C Personal Information X" 322 in updated database 328 is copied into document A 334 along with electronic tag "C" 330 such that "Entity C Personal Information X" 322 may be subsequently found in updated document A 336 using electronic tag "C" 330.

Figure 3E:
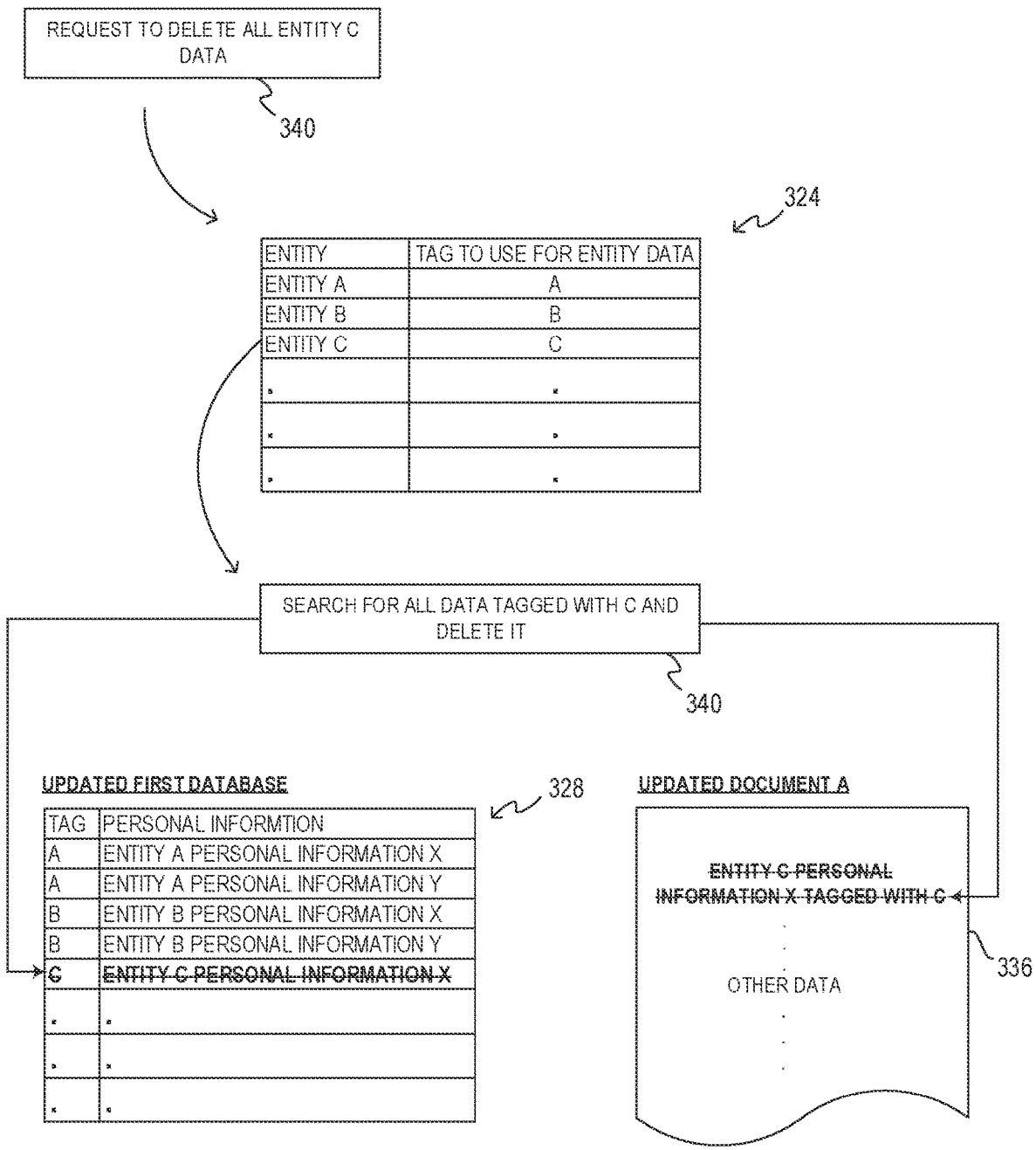
FIG. 3E is a data flow diagram illustrating an example of how all tagged personal information associated with a particular entity may be found and deleted in response to a request, according to embodiments of the present disclosure, and is an improvement in automated computerized systems.

FIG. 3E is a data flow diagram illustrating an example of how all tagged personal information associated with a particular entity may be found and deleted in response to a request, according to embodiments of the present disclosure, and is an improvement in automated computerized systems.

Continuing with the previous example of FIG. 3D, a request 332 is received by the OSP 198 to delete all entity C data from the OSP 198. The service engine 183 electronically searches the registry 324 to find the electronic tag "C" associated with entity C. The service engine 183 then searches 340 all databases, documents and data structures for all data associated with entity C using the electronic tag "C" and finds "Entity C Personal Information X" 322 tagged with electronic tag "C" in the updated first database 328 and in the Updated Document A 336. The service engine 183 then deletes Entity C Personal Information X" 322 tagged with electronic tag "C" from the updated first database 328 and from the updated document A 336. In some embodiments, the service engine 183 may also delete the "Entity C" entry in the registry 324 along with the electronic tag "C".

Figure 3F:
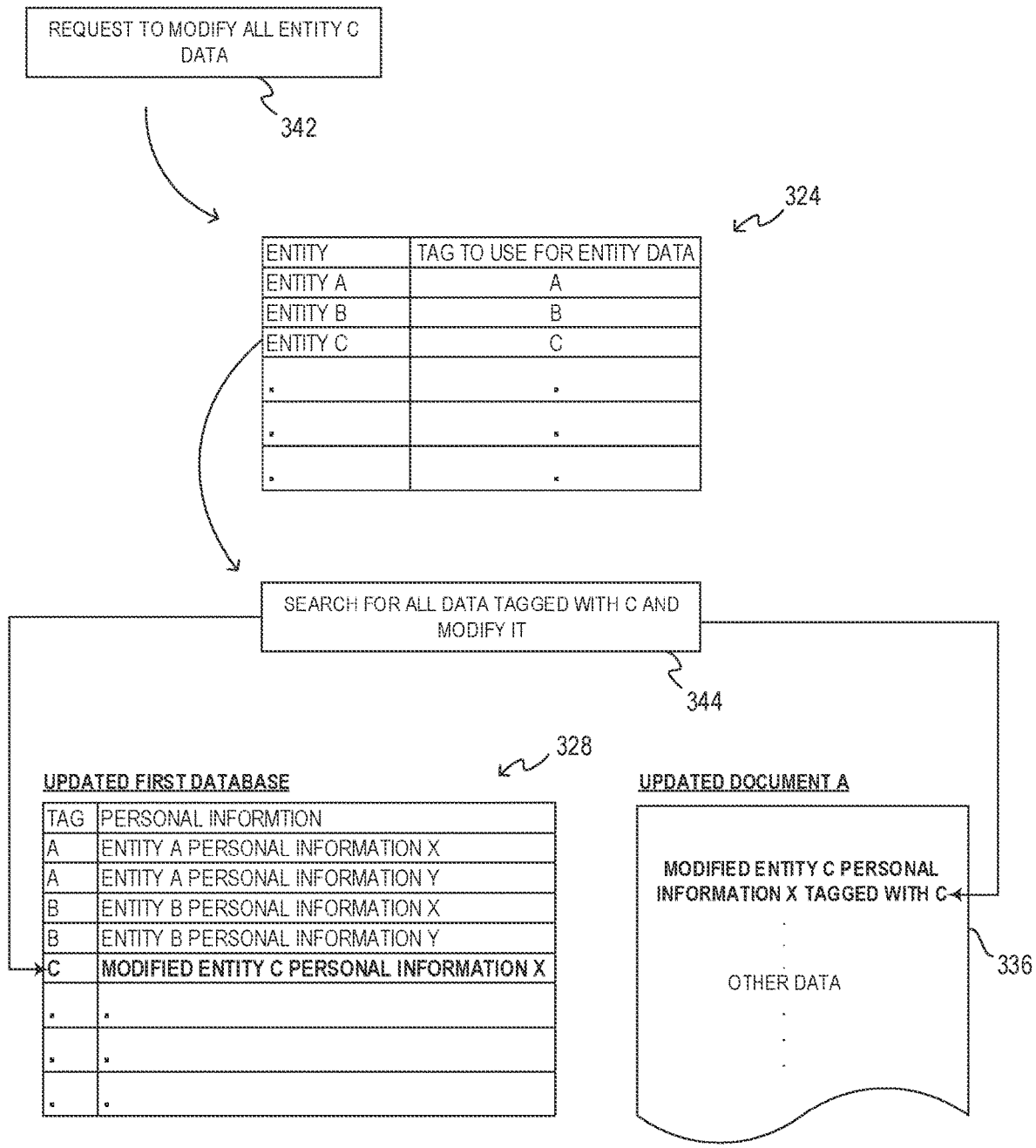
FIG. 3F is a data flow diagram illustrating an example of how particular tagged personal information associated with a particular entity may be found and modified in response to a request, according to embodiments of the present disclosure, and is an improvement in automated computerized systems.

FIG. 3F is a data flow diagram illustrating an example of how particular tagged personal information associated with a particular entity may be found and modified in response to a request, according to embodiments of the present disclosure, and is an improvement in automated computerized systems.

Continuing with the previous example of FIG. 3D, a request 342 is received by the OSP 198 to modify all entity C data from the OSP 198. In some embodiments, one entity may have different tags associated with the entity for different types of data associated with the entity stored by the OSP 198. Thus, the request 342 may indicate to modify all of the specific type of data associated with the entity identified by the tag. The service engine 183 electronically searches the registry 324 to find the electronic tag "C" associated with entity C. The service engine 183 then searches 344 all databases, documents and data structures for all data associated with entity C using the electronic tag "C" and finds "Entity C Personal Information X" 322 tagged with electronic tag "C" in the updated first database 328 and in the updated document A 336. The service engine 183 then modifies Entity C Personal Information X" tagged with electronic tag "C" in the updated first database 328 and the Updated Document A 336 to create" Modified Entity C Personal Information X" according to the request 342.

Figure 4:
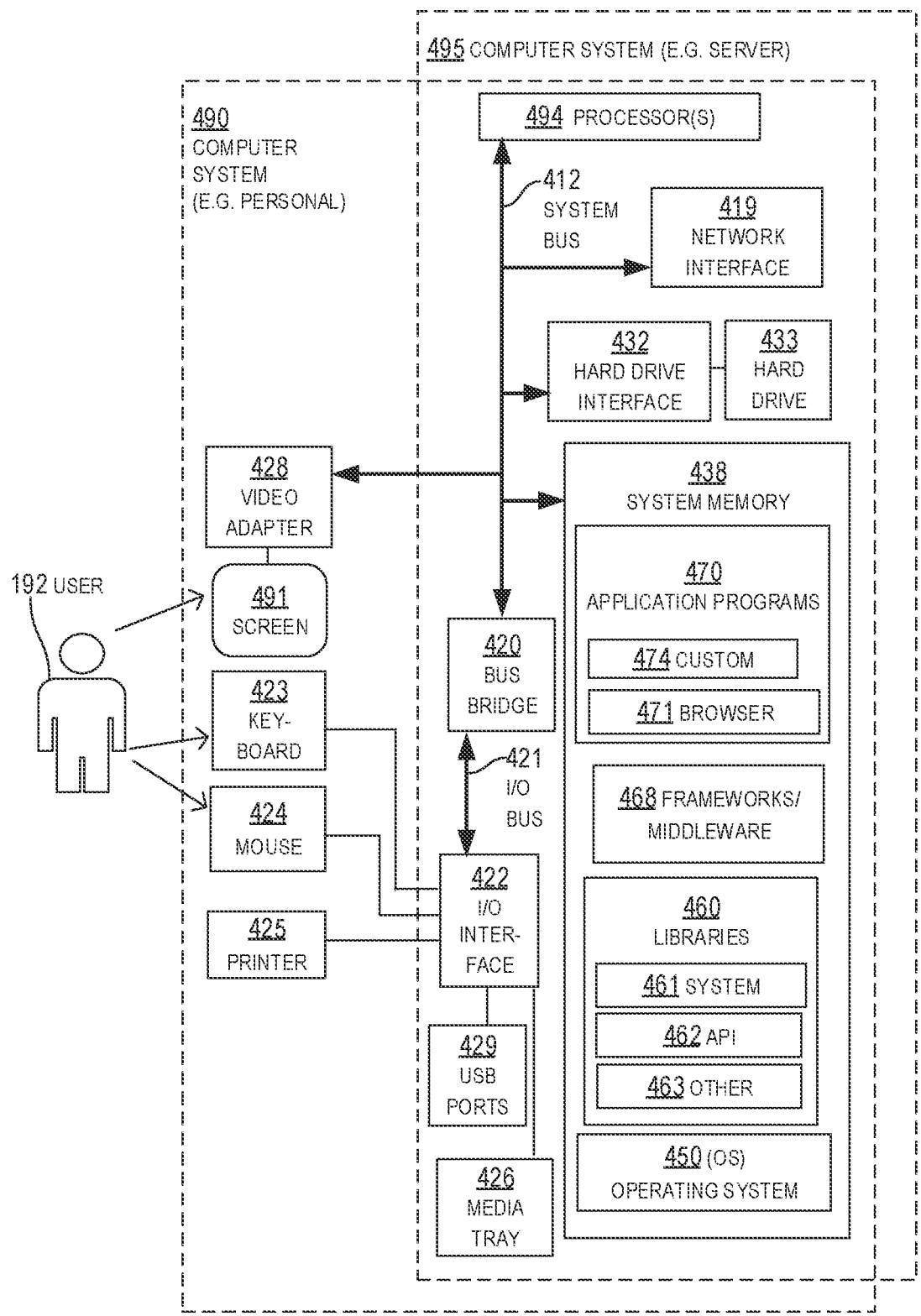
FIG. 4 is a block diagram showing additional components of sample computer systems according to embodiments of the present disclosure, and is an improvement in automated computerized systems.

FIG. 4 is a block diagram showing additional components of sample computer systems according to embodiments of the present disclosure. FIG. 4 shows details for a sample computer system 495 and for a sample computer system 490. The computer system 495 may be a server, while the computer system 490 may be a personal device, such as a personal computer, a desktop computer, a personal computing device such as a laptop computer, a tablet computer, a mobile phone, and so on. Either type may be used for the computer system 195 and 190 of FIG. 1, a computer system that is part of OPF 189 and/or a computer system that is part of any entity or system shown in any of the Figures of the present disclosure.

The computer system 495 and the computer system 490 have similarities, which FIG. 4 exploits for purposes of economy in this document. It will be understood, however, that a component in the computer system 495 may be implemented differently than the same component in the computer system 490. For instance, a memory in a server may be larger than a memory in a personal computer, and so on. Similarly, custom application programs 474 that implement embodiments may be different, and so on.

The computer system 495 includes one or more processors 494. The processor(s) 494 are one or more physical circuits that manipulate physical quantities representing data values. The manipulation can be according to control signals, which can be known as commands, op codes, machine code, etc. The manipulation can produce corresponding output signals that are applied to operate a machine. As such, one or more processors 494 may, for example, include a Central Processing Unit (CPU), a Reduced Instruction Set Computing (RISC) processor, a Complex Instruction Set Computing (CISC) processor, a Graphics Processing Unit (GPU), a Digital Signal Processor (DSP), a Field-Programmable Gate Array (FPGA), an Application Specific Integrated Circuit (ASIC), any combination of these, and so on. A processor may further be a multi-core processor having two or more independent processors that execute instructions. Such independent processors are sometimes called "cores".

A hardware component such as a processor may also include programmable logic or circuitry that is temporarily configured by software to perform certain operations. For example, a hardware component may include software executed by a general-purpose processor or another type of programmable processor. Once configured by such software, hardware components become specific specialized machines, or specific specialized components of a machine, uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

As used herein, a "component" may refer to a device, physical entity or logic having boundaries defined by function or subroutine calls, branch points, Application Programming Interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. The hardware components depicted in the computer system 495, or the computer system 490, are not intended to be exhaustive. Rather, they are representative, for highlighting essential components that can be used with embodiments.

The computer system 495 also includes a system bus 412 that is coupled to the processor(s) 494. The system bus 412 can be used by the processor(s) 494 to control and/or communicate with other components of the computer system 495.

The computer system 495 additionally includes a network interface 419 that is coupled to system bus 412. Network interface 419 can be used to access a communications network, such as the network 188. Network interface 419 can be implemented by a hardware network interface, such as a Network Interface Card (NIC), wireless communication components, cellular communication components, Near Field Communication (NFC) components, Bluetooth® components such as Bluetooth® Low Energy, Wi-Fi® components, etc. Of course, such a hardware network interface may have its own software, and so on.

The computer system 495 also includes various memory components. These memory components include memory components shown separately in the computer system 495, plus cache memory within the processor(s) 494. Accordingly, these memory components are examples of non-transitory machine-readable media. The memory components shown separately in the computer system 495 are variously coupled, directly or indirectly, with the processor(s) 494. The coupling in this example is via the system bus 412.

Instructions for performing any of the methods or functions described in this document may be stored, completely or partially, within the memory components of the computer system 495, etc. Therefore, one or more of these non-transitory computer-readable media can be configured to store instructions which, when executed by one or more processors 494 of a host computer system such as the computer system 495 or the computer system 490, can cause the host computer system to perform operations according to embodiments. The instructions may be implemented by computer program code for carrying out operations for aspects of this document. The computer program code may be written in any combination of one or more programming languages, including an object-oriented programming language such as Java, Smalltalk or the like, and/or conventional procedural programming languages, such as the "C" programming language or similar programming languages such as C++, C Sharp, etc.

The memory components of the computer system 495 include a non-volatile hard drive 433. The computer system 495 further includes a hard drive interface 432 that is coupled to the hard drive 433 and to the system bus 412.

The memory components of the computer system 495 include a system memory 438. The system memory 438 includes volatile memory including, but not limited to, cache memory, registers and buffers. In embodiments, data from the hard drive 433 populates registers of the volatile memory of the system memory 438.

In some embodiments, the system memory 438 has a software architecture that uses a stack of layers, with each layer providing a particular functionality. In this example the layers include, starting from the bottom, an Operating System (OS) 450, libraries 460, frameworks/middleware 468 and application programs 470, which are also known as applications 470. Other software architectures may include less, more or different layers. For example, a presentation layer may also be included. For another example, some mobile or special purpose operating systems may not provide a frameworks/middleware 468.

The OS 450 may manage hardware resources and provide common services. The libraries 460 provide a common infrastructure that is used by the applications 470 and/or other components and/or layers. The libraries 460 provide functionality that allows other software components to perform tasks more easily than if they interfaced directly with the specific underlying functionality of the OS 450. The libraries 460 may include system libraries 461, such as a C standard library. The system libraries 461 may provide functions such as memory allocation functions, string manipulation functions, mathematical functions, and the like.

In addition, the libraries 460 may include API libraries 462 and other libraries 463. The API libraries 462 may include media libraries, such as libraries to support presentation and manipulation of various media formats such as MPEG4, H.264, MP3, AAC, AMR, JPG, and PNG. The API libraries 462 may also include graphics libraries, for instance an OpenGL framework that may be used to render 2D and 3D in a graphic content on the screen 491. The API libraries 462 may further include database libraries, for instance SQLite, which may support various relational database functions. The API libraries 462 may additionally include web libraries, for instance WebKit, which may support web browsing functionality, and also libraries for applications 470.

The frameworks/middleware 468 may provide a higher-level common infrastructure that may be used by the applications 470 and/or other software components/modules. For example, the frameworks/middleware 468 may provide various Graphic User Interface (GUI) functions, high-level resource management, high-level location services, and so forth. The frameworks/middleware 468 may provide a broad spectrum of other APIs that may be used by the applications 470 and/or other software components/modules, some of which may be specific to the OS 450 or to a platform.

The application programs 470 are also known more simply as applications and apps. One such app is a browser 2771, which is a software that can permit the user 192 to access other devices in the internet, for example while using a Graphic User Interface (GUI). The browser 2771 includes program modules and instructions that enable the computer system 495 to exchange network messages with a network, for example using Hypertext Transfer Protocol (HTTP) messaging.

The application programs 470 may include one or more custom applications 474, made according to embodiments. These can be made so as to cause their host computer to perform operations according to embodiments disclosed herein. Of course, when implemented by software, operations according to embodiments disclosed herein may be implemented much faster than may be implemented by a human mind if they can be implemented in the human mind at all; for example, tens or hundreds of such operations may be performed per second according to embodiments, which is much faster than a human mind can do. Such speed of operations, and thus the use of such computing systems and networks, are integral to the embodiments described herein because such operations would be practically useless unless they are able to be applied to hundreds or thousands of computer network clients simultaneously or concurrently across computer networks and to the vast volumes of data that change in real-time provided by such computer network clients. Implementing a practical application of the embodiments described herein to hundreds or thousands of computer network clients simultaneously or concurrently across computer networks on which they operate and to the vast volumes of data that change in real-time provided by such computer network clients is impossible to do in the human mind.

Other such applications 470 may include a contacts application, a word processing application, a location application, a media application, a messaging application, and so on. Applications 470 may be developed using the ANDROID™ or IOS™ Software Development Kit (SDK) by an entity other than the vendor of the particular platform, and may be mobile software running on a mobile operating system such as IOS™, ANDROID™, WINDOWS® Phone, or other mobile operating systems. The applications 470 may use built-in functions of the OS 450, of the libraries 460, and of the frameworks/middleware 468 to create user interfaces for the user 192 to interact with.

The computer system 495 moreover includes a bus bridge 420 coupled to the system bus 412. The computer system 495 furthermore includes an input/output (I/O) bus 421 coupled to the bus bridge 420. The computer system 495 also includes an I/O interface 422 coupled to the I/O bus 421.

For being accessed, the computer system 495 also includes one or more Universal Serial Bus (USB) ports 429. These can be coupled to the I/O interface 422. The computer system 495 further includes a media tray 426, which may include storage devices such as CD-ROM drives, multimedia interfaces, and so on.

The computer system 490 may include many components similar to those of the computer system 495, as seen in FIG. 4. In addition, a number of the application programs may be more suitable for the computer system 490 than for the computer system 495.

The computer system 490 further includes peripheral input/output (I/O) devices for being accessed by a user more routinely. As such, the computer system 490 includes a screen 491 and a video adapter 428 to drive and/or support the screen 491. The video adapter 428 is coupled to the system bus 412.

The computer system 490 also includes a keyboard 423, a mouse 424, and a printer 425. In this example, the keyboard 423, the mouse 424, and the printer 425 are directly coupled to the I/O interface 422. Sometimes this coupling is wireless or may be via the USB ports 429.

In this context, "machine-readable medium" refers to a component, device or other tangible media able to store instructions and data temporarily or permanently and may include, but is not be limited to: a thumb drive, a hard disk, random-access memory (RAM), read-only memory (ROM), buffer memory, flash memory, optical media, magnetic media, cache memory, an Erasable Programmable Read-Only Memory (EPROM), an optical fiber, a portable digital versatile disc (DVD), an optical storage device, a magnetic storage device, or any suitable combination of the foregoing. The machine that would read such a medium includes one or more processors 494.

The term "machine-readable medium" should be taken to include a single medium or multiple media (e.g., a centralized or distributed database, or associated caches and servers) able to store instructions that a machine such as a processor can store, erase, or read. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methods described herein. Accordingly, instructions transform a general or otherwise generic, non-programmed machine into a specialized particular machine programmed to carry out the described and illustrated functions in the manner described.

A computer readable signal traveling from, to, and via these components may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

OPERATIONAL EXAMPLES—USE CASES

The above-mentioned embodiments have one or more uses. Aspects presented below may be implemented as was described above for similar aspects. (Some, but not all, of these aspects have even similar reference numerals.)

As an example use case, the primary entity 193 of FIG. 1 may be a seller 593 of goods or services who uses the electronic services of the OSP 598 to calculate sales tax on transactions of the seller in real-time as the transactions occur as well preparation and sending of an associated tax return document for the transaction 597. In the process of the OSP 598 providing such services, the OSP 598 may collect and store personal and financial seller data 545 of the seller 593. The seller 593 may at some point request the OSP 598 to delete or modify all such seller data stored by the OSP 598. Thus, OSP 598 may offer the feature of additionally specially tagging such data elements, such as seller data 545, with electronic tags consistent for and unique to each client, such as seller 593. Then, if a request for deletion were made by a specific client, such as seller 593, it is fulfilled with much less effort, namely electronically searching for elements with that client's electronic tag 549 according to digital tax and data tracking rules 570, and thus is an improvement to computerized data tracking systems.

Thus, the systems and methods described herein for automated actions for electronically tracking client data improves the functioning of computer or other hardware, such as by reducing the processing, storage, and/or data transmission resources needed to perform various tasks, thereby enabling the tasks to be performed by less capable, capacious, and/or expensive hardware devices, and/or be performed with less latency, and/or preserving more of the conserved resources for use in performing other tasks or additional instances of the same task.

Operational examples and sample use cases are possible where the attribute of an entity in a dataset is any one of: the entity's name; type of entity; a physical location such as an address; a contact information element; transactions of the entity; an identifier of a specific source of revenue received for a transaction of the entity; characteristics of transactions of the entity; licensure and/or or registration of the entity and/or products or services the entity produces, sells, stores and/or transfers; products or services produced, sold, stored and/or transferred by the entity; types of products or services produced, sold, stored and/or transferred by the entity; a location to which products are sent, shipped or transferred; a location from which products are received; a location of a property owned by the entity; a location of a property owned by the entity within a particular region of other domain; an affiliation; a characterization of another entity; a characterization by another entity; an association or relationship with another entity (general or specific instances); an asset of the entity; a declaration by or on behalf of the entity; and so on. Different resources may be produced in such instances, and so on.

Figure 5:
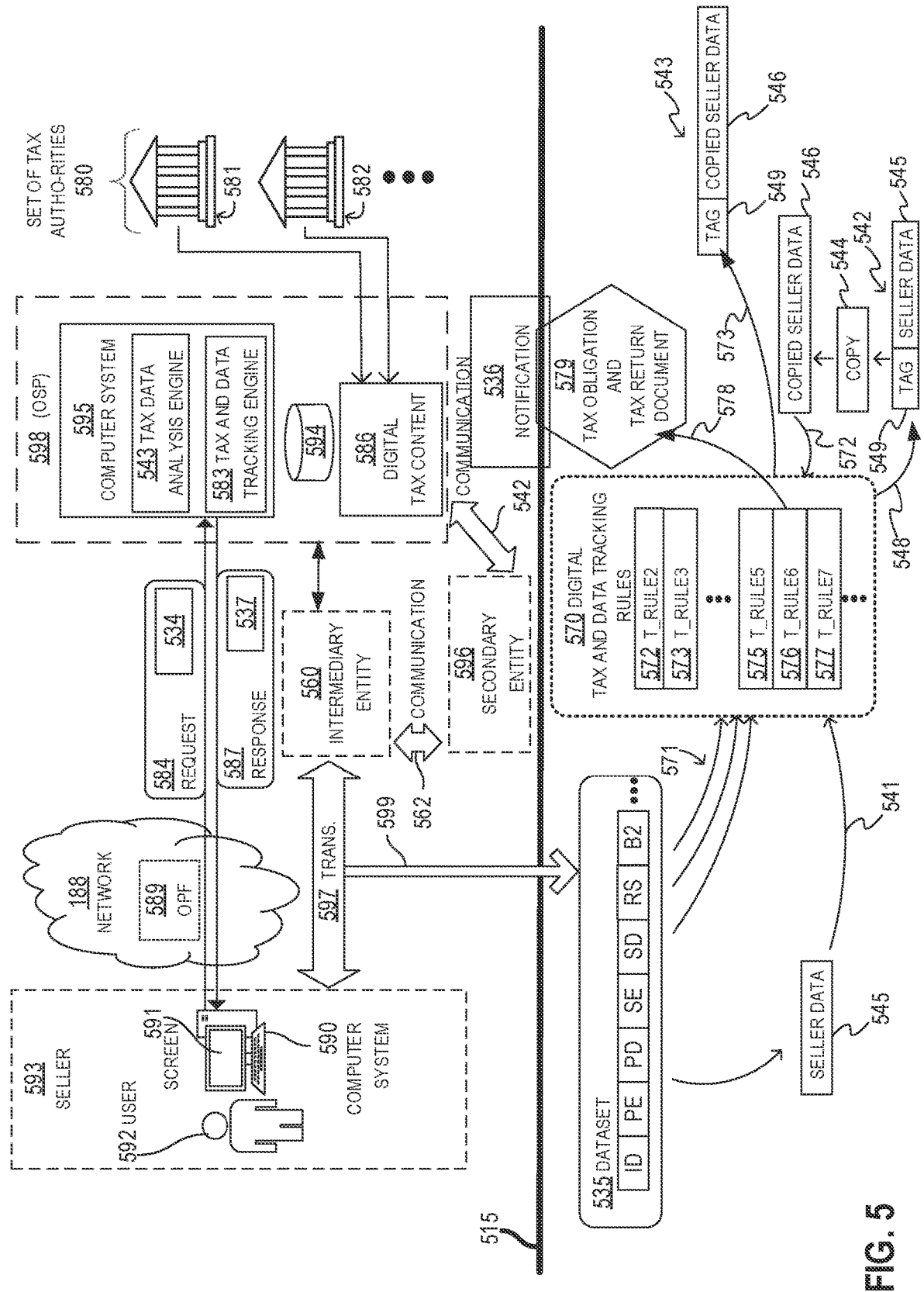
FIG. 5 is a diagram of sample aspects for describing operational examples and use cases of embodiments of the present disclosure that are improvements in automated computerized systems.

FIG. 5 is diagram for an operational example and use case where the resource 579 includes a tax obligation of a seller 593, an intermediary entity 560 and/or a secondary entity 596, due to a transaction 597. The resource 579 may also include the preparation and sending of an associated tax return document for the transaction 597. In the present example, the transaction 597 may be made via an intermediary entity 560 that handles the transaction 597 between the seller 593 and the secondary entity 596 via communication 562 by the intermediary entity 560 with the secondary entity 596. The transaction 597 may include some or all of the data comprising the communication 562 between the intermediary entity 560 and the secondary entity 596. For example, values that characterize attributes of the transaction 597 may be extracted from the communication 562 such as price, fees and/or or rate for the transaction; taxes for the transaction; address or location of the transaction; identification of the seller 593, secondary entity 596 and/or intermediary entity 560; a contract or agreement between the seller and another entity; a contract or agreement regarding collection or remitting of taxes for the transaction; other terms of the transaction; etc. In some embodiments, the communication 562 may be made via network 188. In some instances, some or all of the data comprising the communication 562 may be sent directly to the OSP 598 from the intermediary entity as part of dataset 535. In such embodiments, the transaction 597 would be directly between the seller 593 and the secondary entity 596 instead of being made via the intermediary entity 560 using communication 562 as shown in FIG. 5.

It will be recognized that aspects of FIG. 5 have similarities with aspects of FIG. 1. Portions of such aspects may be implemented as described for analogous aspects of FIG. 1. In particular, a thick line 515 separates FIG. 5, although not completely or rigorously, into a top portion and a bottom portion. Above the line 515 the emphasis is mostly on entities, components, their relationships, and their interactions, while below it the emphasis is mostly processing of data that takes place often within one or more of the components above the line 515.

Above the line 515, a computer system 595 is shown, which is used to help customers, such as a user 592, with tax compliance. Further in this example, the computer system 595 is part of an OSP 598 that is implemented as a Software as a Service (SaaS) provider, for being accessed by the user 592 online. Alternately, the functionality of the computer system 595 may be provided locally to a user.

The user 592 may be standalone. The user 592 may use a computer system 590 that has a screen 591. In embodiments, the user 592 and the computer system 590 are considered part of the seller 593, which is also known as seller 593. The seller 593 can be a business, such as a seller of items, a reseller, a buyer, and so on. In such instances, the user 592 can be an employee, a contractor, or otherwise an agent of the seller 593. In use cases, the secondary entity 596 is a buyer and together they are performing the buy-sell transaction 597. The buy-sell transaction 597 may involve an operation, such as an exchange of data to form an agreement. This operation can be performed in person, or over the network 188, etc. In such cases the seller 593 can even be an online seller, but that is not necessary. The transaction 597 will have data that is known to the seller 593, similarly with what was described by the relationship instance 197 of FIG. 1. In the present example, the transactions 597 may be made via an intermediary entity 560.

In a number of instances, the user 592, the secondary seller 593 and/or the intermediary entity 560 use software applications to manage their business activities, such as sales, resource management, production, inventory management, delivery, billing, and so on. The user 592, the seller 593 and/or the intermediary entity 560 may further use accounting applications to manage purchase orders, reservations, bookings, sales invoices, refunds, payroll, accounts payable, accounts receivable, and so on. Such software applications, and more, may be used locally by the user 592 or intermediary entity 560, or from an Online Processing Facility (OPF) 589 that has been engaged for this purpose by the user 592, the seller 593 and/or intermediary entity 560. In such use cases, the OPF 589 can be a Mobile Payments system, a Point Of Sale (POS) system, an Accounting application, an Enterprise Resource Planning (ERP) system or provider, an e-commerce provider, an electronic marketplace, a Customer Relationship Management (CRM) system, and so on. In some embodiments, the OPF may be, or be used by, the intermediary entity 560.

Businesses have tax obligations to various tax authorities of respective tax jurisdictions. A first challenge is in making the related determinations. Tax-related determinations, made for the ultimate purpose of tax compliance, are challenging because the underlying statutes and tax rules and guidance issued by the tax authorities are very complex. There are various types of tax, such as sales tax, use tax, excise tax, value-added tax, lodging tax, and issues about cross-border taxation including customs and duties, and many more. Some types of tax are industry specific. Each type of tax has its own set of rules. Additionally, statutes, tax rules, and rates change often, and new tax rules are continuously added. Compliance becomes further complicated when a taxing authority offers a temporary tax holiday, during which certain taxes are waived.

Tax jurisdictions are defined mainly by geography. Businesses have tax obligations to various tax authorities within the respective tax jurisdictions. There are various tax authorities, such as that of a country, of a state, of a municipality, of a local district such as a local transit district and so on. So, for example, when a business sells items in transactions that can be taxed by a tax authority, the business may have the tax obligations to the tax authority. These obligations include requiring the business to: a) register itself with the tax authority's taxing agency, b) set up internal processes for collecting sales tax in accordance with the sales tax rules of the tax authority, c) maintain records of the sales transactions and of the collected sales tax in the event of a subsequent audit by the taxing agency, d) periodically prepare a form ("tax return") that includes an accurate determination of the amount of the money owed to the tax authority as sales tax because of the sales transactions, e) file the tax return with the tax authority by a deadline determined by the tax authority, and f) pay ("remit") that amount of money to the tax authority. In such cases, the filing and payment frequency and deadlines are determined by the tax authority.

A technical challenge for businesses is that the above-mentioned software applications generally cannot provide tax information that is accurate enough for the businesses to be tax compliant with all the relevant tax authorities. The lack of accuracy may manifest itself as errors in the amounts determined to be owed as taxes to the various tax authorities, and it is plain not good to have such errors. For example, businesses that sell products and services have risks whether they over-estimate or under-estimate the sales tax due from a sale transaction. On the one hand, if a seller over-estimates the sales tax due, then the seller collects more sales tax from the buyers than was due. Of course, the seller may not keep this surplus sales tax, but instead must pay it to the tax authorities-if they cannot refund it to the buyers. If a buyer later learns that they paid unnecessarily more sales tax than was due, the seller risks at least harm to their reputation. Sometimes the buyer will have the option to ask the state for a refund of the excess tax by sending an explanation and the receipt, but that is often not done as it is too cumbersome. On the other hand, if a seller under-estimates the sales tax due, then the seller collects less sales tax from the buyers, and therefore pays less sales tax to the authorities than was actually due. That is an underpayment of sales tax that will likely be discovered later, if the tax authority audits the seller. Then the seller will be required to pay the difference, plus fines and/or late fees, because ignorance of the law is not an excuse. Further, one should note that sales taxes are considered trust-fund taxes, meaning that the management of a company can be held personally liable for the unpaid sales tax.

For sales in particular, making correct determinations for sales and use tax is even more difficult. There are a number of factors that contribute to its complexity.

First, some state and local tax authorities have origin-based tax rules, while others have destination-based tax rules. Accordingly, a sales tax may be charged from the seller's location or from the buyer's location.

Second, the various tax authorities assess different, i.e. non-uniform, percentage rates of the sales price as sales tax, for the purchase and sale of items that involve their various tax jurisdictions. These tax jurisdictions include various states, counties, cities, municipalities, special taxing jurisdictions, and so on. In fact, there are over 10,000 different tax jurisdictions in the US, with many partially overlapping.

Third, in some instances no sales tax is due at all because of the type of item sold. For example, in 2018 selling cowboy boots was exempt from sales tax in Texas, but not in New York. This non-uniformity gives rise to numerous individual taxability rules related to various products and services across different tax jurisdictions.

Fourth, in some instances no sales tax is due at all because of who the individual buyer is. For example, certain entities are exempt from paying sales tax on their purchases, so long as they properly create and sign an exemption certificate and give it to the seller for each purchase made. Entities that are entitled to such exemptions may include wholesalers, resellers, non-profit charities, educational institutions, etc. Of course, who can be exempt is not exactly the same in each tax jurisdiction. And, even when an entity is entitled to be exempt, different tax jurisdictions may have different requirements for the certificate of exemption to be issued and/or remain valid.

Fifth, it can be difficult to determine which tax authorities a seller owes sales tax to. A seller may start with tax jurisdictions that it has a physical presence in, such as a main office, a distribution center or warehouse, an employee working remotely, and so on. Such ties with a tax jurisdiction establish the so-called physical *nexus*. However, a tax authority such as a state or even a city may set its own *nexus* rules for when a business is considered to be "engaged in business" with it, and therefore that business is subject to registration and collection of sales taxes. These *nexus* rules may include different types of *nexus*, such as affiliate *nexus*, click-through *nexus*, cookie *nexus*, economic *nexus* with thresholds, and so on. For instance, due to economic *nexus*, a remote seller may owe sales tax for sales made in the jurisdiction that are a) above a set threshold volume, and/or b) above a set threshold number of sales transactions.

Even where a seller might not have reached any of the thresholds for economic *nexus*, a number of states are promulgating marketplace facilitator laws that sometimes use such thresholds. According to such laws, intermediaries that are characterized as marketplace facilitators per laws of the state have an obligation, instead of the seller, to collect sales tax on behalf of their sellers, and remit it to the state. The situation becomes even more complex when a seller sells directly to a state, and also via such an intermediary.

To help with such complex determinations and solve such technical problems, the computer system 595 may be a specialized device for tax compliance as disclosed herein. The computer system 595 may have one or more processors and memory, for example, as was described for the computer system 195 of FIG. 1. The computer system 595 thus implements a tax and data tracking engine 583 to make the determinations of tax obligations, track client data and perform preparation and sending of associated tax return document(s). The tax and data tracking engine 583 can be as described for the service engine 183.

The computer system 595 may further store locally entity data, such as seller data 545, i.e., data of user 592, of seller 593 and/or intermediary entity 560, any of which/whom may be a customer, and/or a seller or a buyer in a sales transaction in various embodiments. The entity data may include profile data of the customer and transaction data from which a determination of a tax obligation is desired. In the online implementation of FIG. 5, the OSP 598 has a database 594 for storing the entity data, including seller data 545. This entity data may be inputted by the user 592, and/or caused to be downloaded or uploaded by the user 592 from the computer system 590, from the intermediary entity 560 or from the OPF 589, or extracted from the computer system 590 or from the intermediary entity 560 or from the OPF 589, and so on. In other implementations, a simpler memory configuration may suffice for storing the entity data.

A digital tax content 586 is further implemented within the OSP 598. The digital tax content 586 can be a utility that stores digital tax and data tracking rules 570 for use by the tax and data tracking engine 583. As part of managing the digital tax content 586, there may be continuous updates of the digital tax rules, by inputs gleaned from a set 580 of different tax authorities 581, 582, . . . . Updating may be performed by humans, or by computers, and so on. As mentioned above, the number of the different tax authorities in the set 580 may be very large.

For a specific determination of a tax obligation, the computer system 595 may receive one or more datasets. A sample received dataset 535 is shown just below line 515, which can be similar to what was described for the dataset 135 of FIG. 1. In this example, the computer system 590 transmits a request 584 that includes a payload 534, and the dataset 535 is received by the computer system 595 parsing the received payload 534. In this example the single payload 534 encodes the entire dataset 535, but that is not required, as mentioned earlier.

In this example, the dataset 535 has been received because it is desired to determine any tax obligations arising from the buy-sell transaction 597. As such, the sample received dataset 535 has values that characterize attributes of the buy-sell transaction 597, as indicated by an arrow 599. (It should be noted that the arrow 599 describes a correspondence, but not the journey of the data of the buy-sell transaction 597 in becoming the received dataset 535.) Accordingly, in this example the sample received dataset 535 has a value ID for an identity of the dataset 535 and/or the transaction 597. The dataset 535 also has a value PE for the name of the seller 593 or the user 592, which can be the seller making sales transactions, some online. The dataset 535 further has a value PD for relevant data of the seller 593 or the user 592, such as an address, place(s) of business, prior *nexus* determinations with various tax jurisdictions, and so on. The dataset 535 also has a value SE for the name of the secondary entity 596, which can be the buyer. The dataset 535 further has a value SD for relevant data of the secondary entity 596, entity-driven exemption status, and so on. The dataset 535 has a value B2 for the sale price of the item sold. Any of such data from dataset 535 may comprise seller data 545.

The dataset 535 further has a value RS that includes a unique identifier that contains or identifies information identifying or regarding a revenue source system for revenue received for transaction 597 and the location(s) of one or more properties being rented on the system. The dataset 535 may have fewer values or have additional values, as indicated by the dot-dot-dot in the dataset 535. These values may characterize further attributes, such as characteristics of data identifying of or otherwise relating to a license or registration required for the transaction, a date and possibly also time of the transaction 597, and so on.

The digital tax and data tracking rules 570 have been created so as to accommodate tax rules that the set 580 of different tax authorities 581, 582 . . . promulgate within the boundaries of their tax jurisdictions and to indicate when and how to electronically tag seller data, such that it may be more efficiently found in subsequent searches. In FIG. 5, five sample digital tax and data tracking rules are shown, namely T_RULE2 572, T_RULE3 573, T_RULE5 575, T_RULE6 576 and T_RULE7 577. Additional digital tax and data tracking rules 570 are suggested by the vertical dot-dot-dots. Similarly with FIG. 1, some of these digital tax rules may be digital main rules that determine the tax obligation 579, while others can be digital precedence rules that determine which of the digital main rules is to be applied in the event of conflict. In some use cases, digital main rules may be about a sales tax or use tax being owed due to the transaction 597 at a certain percentage of the purchase price. Digital precedence rules may be digital tax rules that determine whether particular digital tax rules are to be applied for origin-based or destination-based jurisdictions, how to override for diverse taxability of individual items, for temporary tax holidays, for exemptions from having to pay sales tax based on who the buyer is, and also based on *nexus*, and so on. In the present example, digital precedence rules may be digital tax or data tracking rules that determine whether particular digital tax or data tracking rules are to be applied, or particular data is to be electronically tagged.

Similarly with FIG. 1, these digital tax and data tracking rules 570 can be implemented or organized in different ways. In some use cases they can be organized with conditions and consequents, such as was described earlier in this document. Such conditions may relate to geographical boundaries, sources of revenue, effective dates, and so on, for determining where and when a digital tax rule or tax rate is to be applied. These conditions may be expressed as logical conditions with ranges, dates, other data, and so on. Values of the dataset 535 can be iteratively tested against these logical conditions according to arrows 571. In such cases, the consequents may indicate one or more tax obligations, such as to indicate different types of taxes that are due, rules, rates, exemption requirements, reporting requirements, remittance requirements, etc.

In this example, a certain digital tax rule T_RULE6 576 is shown as identified and used, which is indicated also by the beginning of an arrow 578. Identifying may be performed responsive to the values of the dataset 535, which are shown as considered for digital tax and data tracking rules 570 by arrows 571. For example, it can be recognized that a condition of the digital tax rule T_RULE6 576 is met by one or more of the values of the dataset 535. As such, the computer system 595 may produce the tax obligation 579 and tax return document, which is akin to producing the resource 179 of FIG. 1. The computer system 595 may also file or otherwise send (or cause to be filed or sent) the tax return document to one or more of the applicable tax authorities in the set of tax authorities 580 via network 188. The tax obligation 579 can be produced by the computer system 595 applying the certain digital tax rule T_RULE6 576, as indicated by the arrow 578. In this example, the consequent of the identified certain digital tax rule T_RULE6 576 may specify that a tax is due, the amount is to be determined by a multiplication of the sale price of the value B2 by a specific rate, the tax return form that needs to be prepared and filed, a date by which it needs to be filed, and so on.

The computer system 595 may then cause a notification 536 to be transmitted. The notification 536 can be about an aspect of the tax obligation 579, similarly with the notification 136 of FIG. 1. In the example of FIG. 5, the notification 536 is caused to be transmitted by the computer system 595 as an answer to the received dataset 535. The notification 536 can be about an aspect of the tax obligation 579. In particular, the notification 536 may inform about the aspect of the tax obligation 579, namely that it has been determined, where it can be found, what it is, or at least a portion or a statistic of its content, and so on.

The notification 536 can be transmitted to one of an output device and another device that can be the remote device, from which the dataset 535 was received. The output device may be the screen of a local user or a remote user. The notification 536 may thus cause a desired image to appear on the screen, such as within a Graphical User Interface (GUI) and so on. The other device may be a remote device, as in this example. In particular, the computer system 595 causes the notification 536 to be communicated by being encoded as a payload 537, which is carried by a response 587. The response 587 may be transmitted via the network 188 responsive to the received request 584. The response 587 may be transmitted to the computer system 590, intermediary entity 560 or to OPF 589, and so on. As such, the other device can be the computer system 590, or a device of the OPF 589, or the screen 591 of the user 592, and so on. In this example the single payload 537 encodes the entire notification 536, but that is not required, similarly with what is written above about encoding datasets in payloads. Along with the aspect of the tax obligation 579, it is advantageous to embed in the payload 537 the ID value and/or one or more values of the dataset 535. This will help the recipient correlate the response 587 to the request 584, and therefore match the received aspect of the tax obligation 579 as the answer to the received dataset 535.

Also, in this example, it may occur that the seller 593 provides certain data that comprises or is part of the dataset 535 which the seller 193 at some point may request the OSP 598 to delete or modify (e.g., financial or personal data of the seller 593 related to or resulting from the tax and data tracking engine 583 performing the digital tax services for seller 593). In order to more efficiently fulfill the electronic request to delete or modify all of such data associated with or provided by seller 593, in various embodiments, the OSP 598 may electronically track such data via electronically tagging such data it receives, and causing that tag (e.g., tag 549) to automatically follow such data whenever it is electronically copied or modified. For example, in one embodiment, the OSP 598 may electronically associate the received seller data 545 with the seller 593. The OSP 598 then applies 541 one or more of the digital tax and data tracking rules 570 to electronically tag 548 the received seller data 545 with an electronic tag 549 uniquely associated with the seller 593, including an identifier uniquely associated with the seller 193. The OSP 598 then electronically stores the received seller data 545 as tagged data 542, such that the received seller data 545 is identifiable via the electronic tag 549. In response to the seller data 545 being copied due to a copy operation 544 into another database or document, the OSP 598 may then apply 572 one or more of the digital tax and data tracking rules 570 to electronically tag 573 with the electronic tag 549 the copied seller data 546 associated with the seller 193 resulting from the copy operation 544 performed on the stored received seller data 545, such that the copied seller data 546 associated with the seller 593 resulting from the copy operation 544 performed on the stored received seller data 545 is also identifiable via the electronic tag 549. The OSP 598 then electronically stores the tagged copied seller data 543 associated with the seller 593 resulting from the copy operation 544 performed on the stored received seller data 545 such that the copied seller data 546 associated with the seller 593 resulting from the copy operation 544 performed on the stored received seller data 545 is also identifiable via the electronic tag 549.

When and how to perform such tagging may be indicated by and performed according to one or more digital tax and data tracking rules 570 stored by or otherwise accessible by the OSP 598. For example, the automatic electronic tagging of the seller data 545 may be performed upon receipt of the seller data 545 from the seller 593 via dataset 535 according one or more digital tax and data tracking rules 570. In one embodiment, the condition indicated by one of the digital tax and data tracking rules 570 for tagging the seller data 545 with electronic tag 549 associated with seller 593 is that the seller data 545 must be received from seller 593, as indicated by the dataset 535 and/or the request 584. Also, a condition indicated by one of the seller data 545 for tagging the copied seller data 546 with electronic tag 549 associated with seller 593 is that the copy operation 544 is an action performed on data tagged with electronic tag 549 associated with seller 593.

Figure 6:
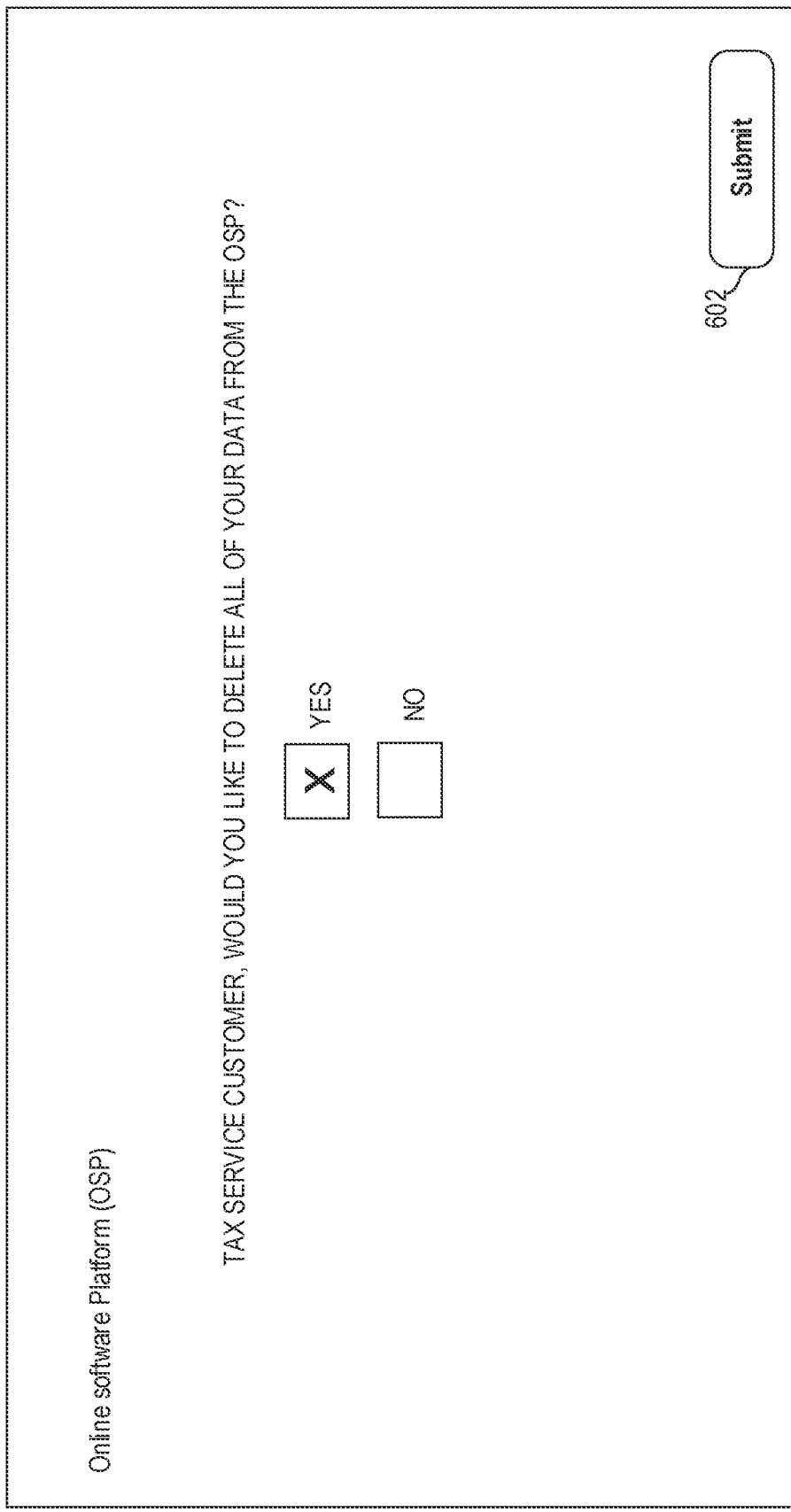
FIG. 6 is a sample view of a User Interface (UI) for an OSP in which a tax service customer may request deletion of all their data from the OSP in a use case of an embodiment according to various embodiments of the present disclosure, and is an improvement in automated computerized systems.

FIG. 6 is a sample view of a User Interface (UI) 600 for OSP 549 in which a tax service customer, such as seller 549 may request deletion of all their data from the OSP 549 in a use case of an embodiment according to various embodiments of the present disclosure, and is an improvement in automated computerized systems. In the present example, the user 592 has selected a selectable UI element (a check box) to indicate the seller 549 would like to delete all of their data from the OSP 549. The user 592 may then select a submit button 602 displayed on the UI 600 to initiate the action to delete all of the seller's data from the OSP 549. In some embodiments, the OSP 549 may then identify the electronic tag used to tag the sellers data in the OSP 549 present another UI screen in response to the user selecting the submit button 602, that displays some or all of the data tagged with the electronic tag, asking the user 592, "is this the data you meant?" When the user confirms it, then the OSP 549 knows the unique tag with the identifier related to that data, and combs through all of the OSP 549 systems looking for any piece of data that was tagged with that electronic tag in order to delete it.

Figure 7:
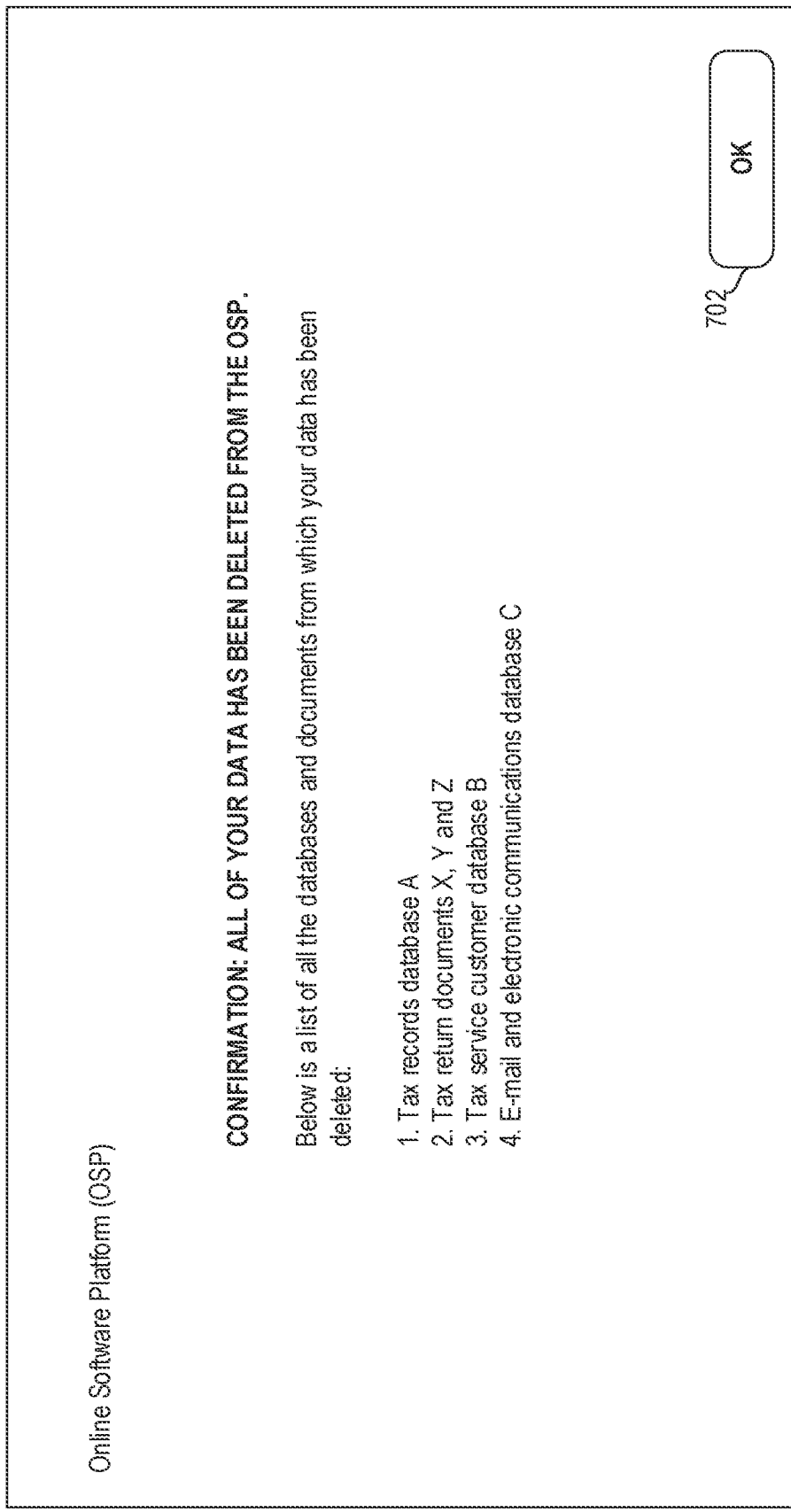
FIG. 7 is a sample view of a UI for the OSP in which a confirmation is displayed indicating deletion of all the tax service customer's data from the OSP that has been performed in a use case of an embodiment according to various embodiments of the present disclosure, and is an improvement in automated computerized systems.

FIG. 7 is a sample view of a UI 700 for the OSP 598 in which a confirmation is displayed indicating deletion of all the seller's data from the OSP 598 has been performed in a use case of an embodiment according to various embodiments of the present disclosure, and is an improvement in automated computerized systems. In the present example, the UI 700 displays a list of all the databases and documents from which your data has been deleted, including: 1. Tax records database A 2. Tax return documents X, Y and Z 3. Tax service customer database B and 4. E-mail and electronic communications database C. The user 592 may select an OK button 702 to accept the confirmation. In some embodiments, the information displayed in UI 700 may be communicated in a notification, similar to how notification 536 is generated and transmitted.

The embodiments described above may also use synchronous or asynchronous client-server computing techniques, including software as a service (SaaS) techniques. However, the various components may be implemented using more monolithic programming techniques as well, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the functions of the systems and methods described herein.

In addition, programming interfaces to the data stored as part of the system controller 210 and other system components described herein may be available by mechanisms such as through C, C++, C#, and Java APIs; libraries for accessing files, databases, or other data repositories; through scripting languages such as JavaScript and VBScript; or through Web servers, FTP servers, or other types of servers providing access to stored data. The databases described herein and other system components may be implemented by using one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the embodiments in a distributed manner including but not limited to TCP/IP sockets, RPC, RMI, HTTP, Web Services (XML-RPC, JAX-RPC, SOAP, and the like). Other variations are possible. Also, other functionality may be provided by each component/module, or existing functionality could be distributed amongst the components/modules in different ways, yet still achieve the functions described herein.

Where a phrase similar to "at least one of A, B, or C," "at least one of A, B, and C," "one or more A, B, or C," or "one or more of A, B, and C" is used, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

As used herein, the term "or" may be construed in either an inclusive or exclusive sense. Moreover, plural instances may be provided for resources, operations, or structures described herein as a single instance. Additionally, particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, including:
at least one processor; and
a memory coupled to the at least one processor, the memory storing instructions that, when executed by the at least one processor, cause the system to perform operations including:
an online software platform (OSP) electronically receiving a first data;

electronically associating the received first data with an entity;

electronically tagging the received first data with an electronic tag uniquely associated with the entity, the electronic tag including an identifier uniquely associated with the entity;

electronically storing the received first data such that the received first data is identifiable via the electronic tag;

electronically tagging with the electronic tag a second data associated with the entity resulting from an action performed on the stored received first data such that the second data associated with the entity resulting from the action performed on the stored received first data is also identifiable via the electronic tag;

electronically storing the tagged second data associated with the entity resulting from the action performed on the stored received first data such that the second data associated with the entity resulting from the action performed on the stored received first data is also identifiable via the electronic tag; and the OSP applying digital rules to a dataset to determine a resource in response to a request.

2. The system of claim 1 in which the instructions, when executed by the at least one processor, further cause the system to perform operations including:

electronically receiving a request regarding all data associated with the entity that is stored by the OSP;

in response to receiving the request, electronically searching, using the electronic tag, for all data associated with the entity that is stored by the OSP;

electronically identifying, based on the searching, all data stored by the OSP that is tagged with the electronic tag uniquely associated with the entity;

electronically performing an action indicated by the request regarding all the data stored by the OSP that is tagged with the electronic tag uniquely associated with the entity.

3. The system of claim 2 in which the action indicated by the request is electronic deletion of all the data stored by the OSP that is associated with the entity.

4. The system of claim 2 in which the action indicated by the request is electronically sending a report regarding all the data stored by the OSP that is associated with the entity.

5. The system of claim 1 in which the electronically tagging with the electronic tag the second data associated with the entity resulting from an action performed on the stored received first data includes:

copying the electronic tag along with the stored received first data, or any piece of the stored received first data identified as unique to the entity, whenever the stored received first data, or any piece of the stored received first data identified as unique to the entity, is moved or copied to a different database or electronic document than in which the stored received first data was originally stored, according to a first digital rule.

6. The system of claim 5 in which the electronically tagging with the electronic tag the second data associated with the entity resulting from an action performed on the stored received first data includes:

copying the tag along with the stored received first data, or any piece of the stored received first data identified as unique to the entity, whenever the stored received first data, or any piece of the stored received first data identified as unique to the entity, is modified and then moved or copied to a different database or electronic document than in which the stored received first data was originally stored, according to a second digital rule.

7. The system of claim 6 in which the electronically tagging with the electronic tag the second data associated with the entity resulting from an action performed on the stored received first data includes:

maintaining the electronic tag as associated with the stored received first data, or any piece of the stored received first data identified as unique to the entity, whenever the stored received first data, or any piece of the stored received first data identified as unique to the entity, is modified, according to a third digital rule.

8. The system of claim 7 in which each piece of the stored received first data identified as unique to the entity is identified as unique to the entity via the electronic tag also being associated, according to a fourth digital rule, with the piece of the stored received first data identified as unique to the entity.

9. The system of claim 1 in which the electronically tagging with the electronic tag second data associated with the entity resulting from an action performed on the stored received first data includes:

electronically tagging with the electronic tag the second data associated with the entity resulting from an action performed on the stored received first data, according to one or more digital rules.

10. The system of claim 1 in which the action performed on the stored received first data includes copying, moving or modifying the stored received first data.

11. The system of claim 1 in which:

the electronically tagging the received data includes electronically recording an association of the electronic tag with the received data as a transaction on a blockchain, the transaction on the blockchain associated with the electronic tag and with the received data; and the electronically tagging with the electronic tag the second data associated with the entity resulting from an action performed on the stored received first data includes electronically recording the action performed on the stored received first data as an additional transaction on the blockchain, the additional transaction on the block chain associated with the electronic tag and with the second data associated with the entity resulting from the action performed on the stored received first data.

12. The system of claim 8 in which the stored received first data includes one or more of: an electronic document associated with the entity; one or more content items associated with the entity; a category of data associated with the entity; a dataset associated with the entity; a collection of data associated with the entity; a name of the entity; an address of the entity; sales data of the entity; a location of the entity; a social security number of the entity; a tax identifier of the entity; identifying number or code of the entity; a telephone number of the entity, an email address of the entity; contact information for the entity; business data of the entity; user name of the entity; login credentials of the entity; electronic documents of the entity; financial information of the entity; personal information of the entity; confidential information of the entity and personal identifiable information of the entity.

* * * * *